(12) United States Patent
Araujo et al.

(10) Patent No.: US 7,170,913 B2
(45) Date of Patent: Jan. 30, 2007

(54) LASER SOURCE WITH CONFIGURABLE OUTPUT BEAM CHARACTERISTICS

(75) Inventors: Francisco M. Araujo, Oporto (PT); Joao M. Sousa, Valongo (PT); Jose R. Salcedo, Oporto (PT)

(73) Assignee: Multiwave Photonics, SA, Moreira da Maia (PT)

( * ) Notice: Subject to any disclaimer, the term of this patent is extended or adjusted under 35 U.S.C. 154(b) by 153 days.

(21) Appl. No.: 10/464,744

(22) Filed: Jun. 19, 2003

(65) Prior Publication Data

US 2004/0258106 A1 Dec. 23, 2004

(51) Int. Cl.
*H01S 3/13* (2006.01)
*H01S 3/00* (2006.01)

(52) U.S. Cl. .............................. 372/29.011; 372/38.01

(58) Field of Classification Search .................. 372/9, 372/32, 29.011, 38.01
See application file for complete search history.

(56) References Cited

U.S. PATENT DOCUMENTS

| 5,444,725 | A |   | 8/1995 | Zirngibl |
| 5,576,881 | A |   | 11/1996 | Doerr et al. |
| 5,636,238 | A |   | 6/1997 | Mohebati et al. |
| 5,675,592 | A |   | 10/1997 | Dragone et al. |
| 5,805,625 | A | * | 9/1998 | Langner et al. ............ 372/35 |
| 5,835,512 | A |   | 11/1998 | Wada et al. |
| 5,881,079 | A |   | 3/1999 | Doerr et al. |
| 5,923,685 | A |   | 7/1999 | Akagawa et al. |
| 5,936,981 | A |   | 8/1999 | Wada et al. |
| 6,028,881 | A |   | 2/2000 | Ackerman et al. |
| 6,134,250 | A |   | 10/2000 | Koren et al. |
| 6,389,047 | B1 |   | 5/2002 | Fischer |
| 6,606,331 | B2 | * | 8/2003 | Sousa et al. ............... 372/32 |
| 6,606,337 | B1 | * | 8/2003 | King .......................... 372/70 |
| 6,726,377 | B2 | * | 4/2004 | Yang ........................... 385/92 |
| 2001/0050928 | A1 |   | 12/2001 | Cayrefourcq et al. |
| 2002/0176473 | A1 |   | 11/2002 | Mooradian |
| 2002/0181089 | A1 |   | 12/2002 | Muhlhoff et al. |

FOREIGN PATENT DOCUMENTS

| JP | 2001-100259 | 4/2001 |
| JP | 2001-102682 | 4/2001 |
| JP | 2001-102692 | 4/2001 |

* cited by examiner

*Primary Examiner*—Armando Rodriguez
(74) *Attorney, Agent, or Firm*—Paul, Hastings, Janofsy & Walker LLP

(57) ABSTRACT

A laser system based on a common platform capable of being tailored to meet specific application requirements through simple and flexible means is disclosed. The output beam characteristics of the laser source are fully determined by a plug-in module that can be easily replaced on demand to modify one or more of those output beam characteristics. A connection module provides a robust, flexible and detachable connection between the common laser platform and the plug-in module, thus ensuring stable and well defined laser output beam without precluding on demand adjustment of its characteristics. Several embodiments are disclosed for a laser system with single or multiple output beams both with similar or dissimilar characteristics.

50 Claims, 21 Drawing Sheets

LASER SOURCE WITH CONFIGURABLE OUTPUT BEAM CHARACTERISTICS

BACKGROUND OF THE INVENTION

1. Field of Invention

This invention relates to lasers and, more specifically, to lasers with configurable output beam characteristics. It also pertains to methods by which such lasers may be made to operate.

2. Description of Related Art

A laser source, or simply laser, is a source of radiation created by the amplification of light (visible or invisible electromagnetic radiation) through stimulated emission. Laser sources are characterized by their well-known unique emission characteristics, among these being wavelength, monochromaticity, coherence, beam directionality and brightness.

Lasers generally share the same four elements: a gain medium, a pump mechanism, a high-finesse cavity, and an output coupler. The gain medium provides light radiation amplification through amplified stimulated emission, the high-finesse cavity enables laser oscillation, the pump mechanism restores the gain medium energy thus allowing regenerative light amplification, and the output coupler enables the extraction of a fraction of the radiation contained within the high finesse cavity in the form of a useful laser output beam. The laser output beam has both spectral and spatial characteristics determined by the laser design. Practical laser devices may employ a high variety of gain media materials, pumping mechanisms and design approaches, and find usefulness in a wide range of applications.

Typically, a particular application requires a laser with well-defined output beam characteristics. Even within the same application, however, it is often required that these laser sources share a set of common specifications, but differ among themselves in only one relevant output beam characteristic. Consequently, it has generally been the case that each of the lasers needed to be individually custom designed to meet its respective specifications, sometimes entailing major design modifications and the attendant increased manufacturing costs and reduced flexibility.

A wavelength division multiplexing (WDM) telecommunication system is one well-known example of an application where several laser sources each with the same set of specifications, but respectively emitting at wavelengths different from one another are required. Conceptually this method increases the communication capacity by enabling the use of more than one optical carrier on a single fiber. In practice, WDM is accomplished by multiplexing the outputs of at least two lasers onto a single optical fiber. After transmission, at the receiving end, the reverse operation is performed allowing the multiple frequencies to be demultiplexed. To further expand the communication capability of each individual optical fiber, the WDM concept has been extended to enclose a set of closely-spaced wavelengths in the 1550 nm transmission window, such an implementation is referred to as dense wavelength division multiplexing (DWDM). The International Telecommunication Union (ITU) has established the use of a grid of frequencies in this window. The channels are anchored to a reference at 193.10 THz and equally spaced in frequency, the closely spaced grids having channels 100 GHz or a sub-multiple of that spacing, such as 50 GHz, 25 GHz, 12.5 GHz, or other.

Communication systems to implement this scheme thus must comprise laser sources that have emissions at each of the grid frequencies. This can be accomplished by having a multitude of different laser sources, each emitting at a frequency that matches one of the grid frequencies. The uninterrupted operation of such communication systems inherently requires a large volume of spare parts to be readily available on stock, which results in high running costs.

SUMMARY OF THE INVENTION

The present invention overcomes these and other deficiencies of the prior art by providing a laser system based on sources having shared characteristics, but which can be tailored individually to meet specific requirements through simple and flexible means.

In the present invention a method and apparatus are presented that allow laser output characteristics to be easily configured or modified on demand without the need for a custom laser design. This apparatus is based on a common laser platform where the relevant output beam characteristics are configured by interchangeable plug-in modules.

In an embodiment of the invention, a laser apparatus comprises: a common laser platform; a plug-in module for determining at least one output characteristic of the laser apparatus; and a connection module for detachably coupling the plug-in module with the common laser platform. The common laser platform contains an optically-coupled arrangement of: a pump module for generating pump radiation; a gain module which is pumped by the pump radiation, the pump radiation exciting the gain module thereby enabling generation of laser radiation; a feedback module to provide feedback for the laser radiation; and an output coupler module for optically coupling the laser radiation externally to the laser apparatus, thereby providing a useful laser output beam.

The plug-in module is connected to the common laser platform through the connection module defining a coupled resonator laser configuration. The plug-in module comprises a set of passive and/or active elements to define and control the optical spectrum, the optical power, the polarization state, the divergence, and/or the spatial profile of the laser output beam. Moreover, the plug-in module further comprises means to extract one or multiple laser output beams.

In the present invention, a laser system based on a common platform capable of being set on demand to any ITU channel through simple and flexible means is provided as a laser source for DWDM communication systems. Such a common laser platform is capable of having an emission frequency set to any of the ITU grid frequencies by a detachable connection to a plug-in module. This type of laser source proves advantageous in sparing configurations for DWDM, and allows for reconfigurable DWDM optical communication networks and network elements. For DWDM applications the laser source needs not be continuously tunable, being that a discrete set of low-cost plug-in modules each corresponding to an individual ITU channel offers full operation while sustaining a low degree of complexity. Such an apparatus is tunable across the widest possible frequency range, preferably across the whole ITU grid, and provides high optical output power across its whole frequency operating range.

In an embodiment of the invention, an apparatus comprises a pump module for generating pump radiation, a ring laser resonator, an input coupler for optically coupling the pump radiation into the laser resonator, and an output coupler for optically coupling laser radiation out of the laser resonator. The laser resonator itself preferably includes an optically-coupled arrangement of a gain module which is pumped by the pump radiation, the pump radiation exciting the gain module thereby achieving lasing action in the laser resonator, a plug-in module which defines and controls at least one of the laser output optical emission spectrum characteristics, and a connection module that provides a robust, flexible and detachable connection of the plug-in module to the laser resonator.

The present invention provides a cost-effective and efficient laser system for producing different laser frequencies without having to correspondingly increase the number of different laser sources.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

FIGS. 6(a) and 6(b) are schematic diagrams of a presently preferred embodiment of a laser source according to the present invention, in which FIG. 6(a) shows a linear cavity configuration with a useful laser output provided by a plug-in module, and in which FIG. 6(b) shows a ring cavity configuration with a useful laser output provided by a plug-in module.

DETAILED DESCRIPTION OF PREFERRED EMBODIMENTS

Figure 1A:
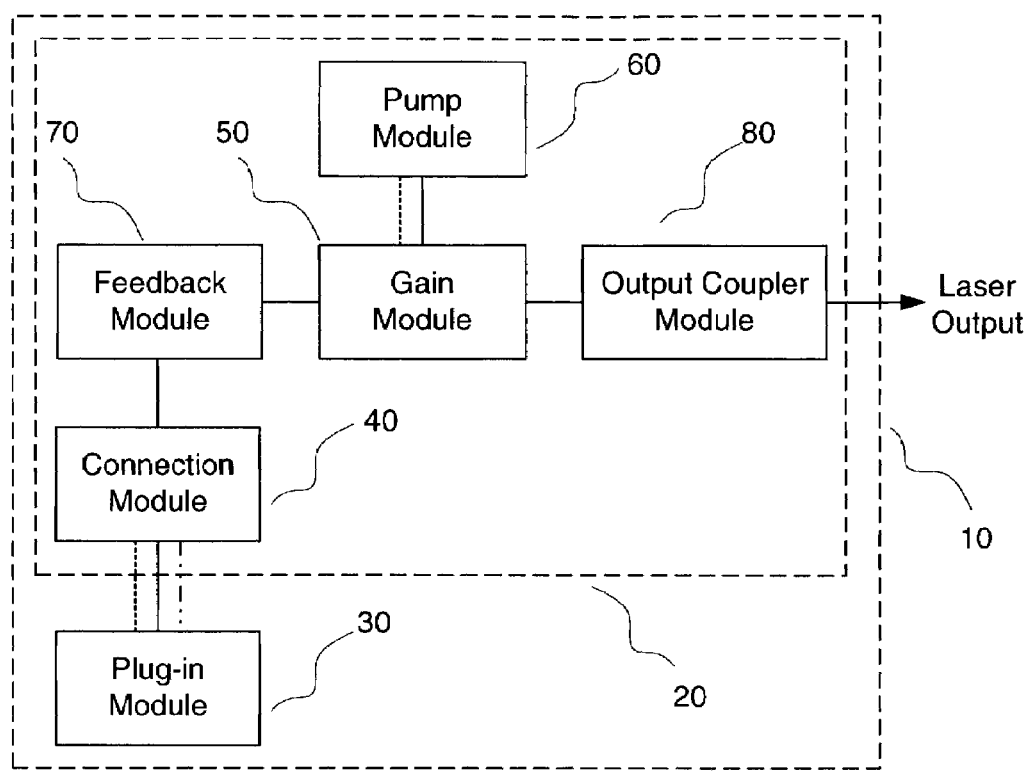
FIGS. 1(a) and 1(b) are schematic diagrams of presently preferred embodiments of a laser source with adaptable output characteristics according to the present invention, with FIG. 1(a) showing a linear cavity configuration and FIG. 1(b) showing a ring cavity configuration.

Preferred embodiments of the present invention and their advantages may be understood by referring to FIGS. 1–14, wherein like reference numerals refer to like elements.

Figure 1B:
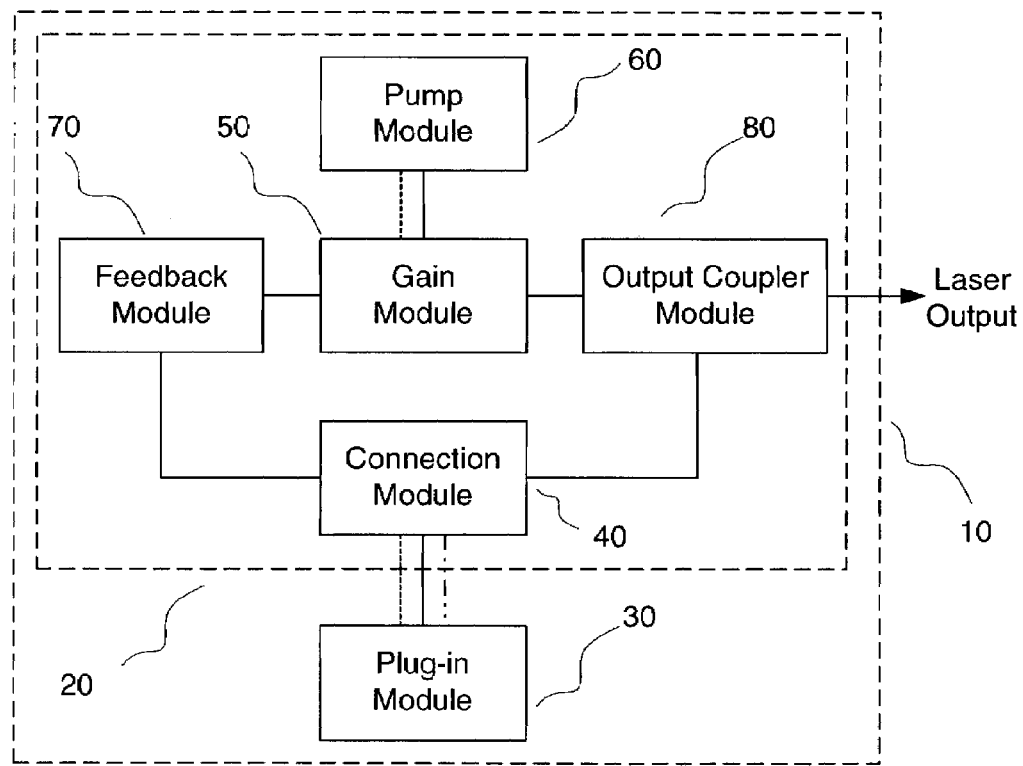

FIGS. 1(a) and 1(b) are schematic diagrams of presently preferred embodiments for a laser source 10 according to the present invention. The laser source 10 can be implemented either in a linear cavity configuration as illustrated in FIG. 1(a) or in a ring cavity configuration as illustrated in FIG. 1(b). These configurations preferably include several laser modules, as described below. While for the sake of illustration a specific relative ordering of modules is shown, it will be readily apparent to one of ordinary skill in the art that these modules may be placed within the laser source 10 in relative orderings other than those shown and described.

The arrangements shown in these figures include two major blocks, a common laser platform 20 and a plug-in module 30. The connection between the two blocks is achieved by a connection module 40 included in the common laser platform 20. The common laser platform 20 does not include components to limit the laser source 10 to a specific set of output beam characteristics. Rather, the common laser platform 20 functions as a generic, common base capable of attaining a broad range of output beam characteristics. The specific output beam characteristics of the laser source 10 required for an application are defined and controlled by the plug-in module 30. These optical output beam characteristics include, but are not limited to the output beam's emission spectrum, power, polarization state, divergence and spatial profile.

The laser source 10 includes a gain medium, a pump mechanism, a laser resonator and an output coupler. The gain medium provides light radiation amplification through amplified stimulated emission and, the functional gain module 50 includes this element. The pump mechanism ensures that the gain medium energy is restored, thus allowing regenerative light amplification and, the functional pump module 60 includes this element. An efficient laser resonator ensures proper feedback mechanism for the laser radiation within the cavity, thus allowing sustainable laser action. The functional feedback module 70 incorporates such a feedback mechanism. The output coupler enables the extraction of a fraction of the radiation contained within the laser resonator in the form of a useful laser output beam. The functional output coupler module 80 incorporates such an output coupler. In the presently preferred embodiment of the laser source 10, an efficient laser resonator is obtained by a proper arrangement of these four elements. Also, in the presently preferred embodiment, the laser resonator is arranged either in a linear or a ring configuration as depicted.

In the figures it will be understood that the lines interconnecting the functional modules are intended to depict functional connections. Here and elsewhere, solid lines represent optical path connections, dashed lines represent electrical path connections and dot-dashed lines represent mechanical path connections. These connections enable optimized operation of laser source 10. It will be readily apparent to one of ordinary skill in the art that these connections between different modules are arranged so that optical radiation, electric current and/or mechanical action may pass from one module to the other or vice versa, possibly passing through one or more active or passive intermediate optical, electrical or mechanical elements along the way. Also, in the figures it will be understood that arrows represent single or multiple optical output beams. It will be readily apparent to one of ordinary skill in the art that the optical interconnecting path can be defined by an open-air passage, by an optical waveguide, by an optical fiber, or by any other optical connection known in the art. Similarly, it will be readily apparent to one of ordinary skill in the art that the electrical interconnecting path can be defined by electric conductor, semiconductor or any other electrical connection known in the art and that the mechanical interconnecting path can be defined by transducer, or any other mechanical connection known in the art.

Figure 2A:
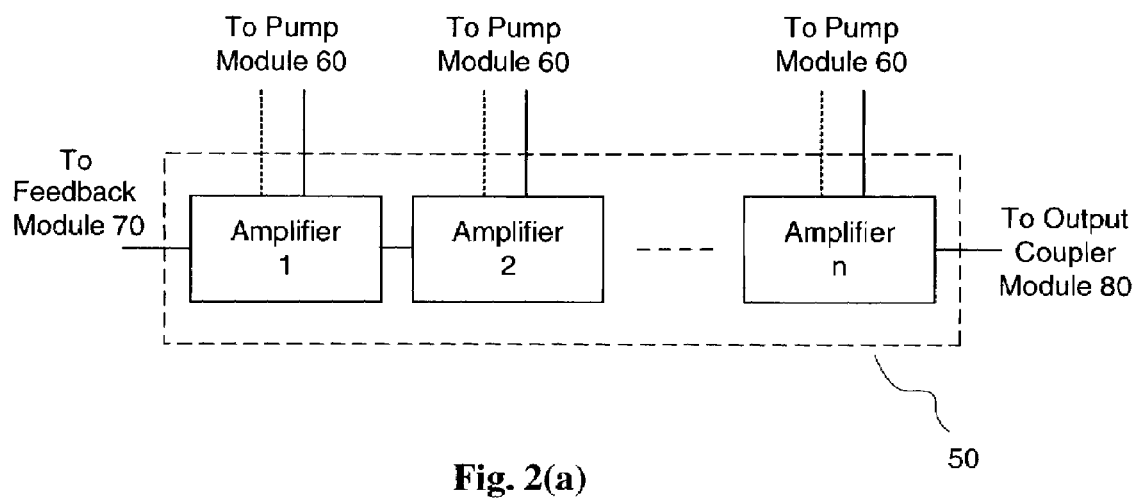
FIGS. 2(a) and 2(b) are schematic diagrams of a presently preferred embodiment of a gain module according to the present invention, with FIG. 2(a) showing a gain module including multiple stage amplifiers arranged in a serial configuration, and with FIG. 2(b) showing a gain module including multiple stage amplifiers arranged in a parallel configuration.
Figure 2B:
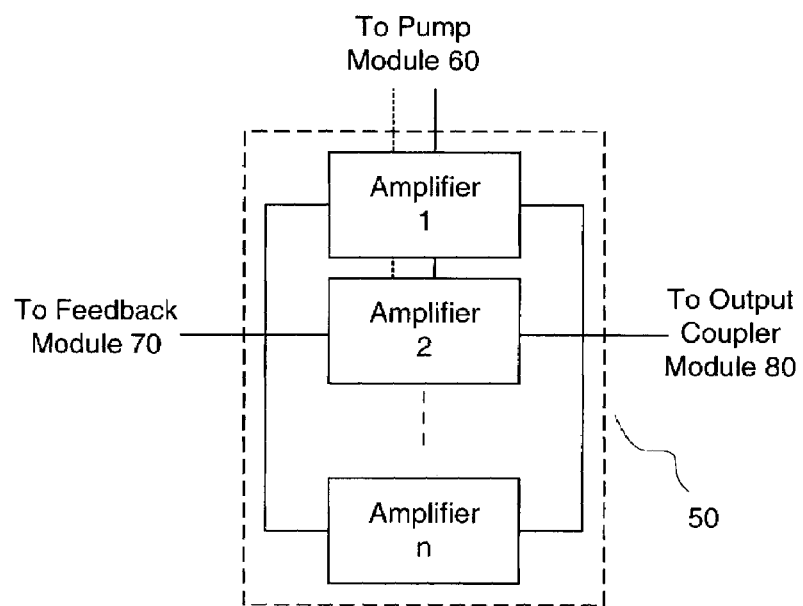

In the presently preferred embodiment, the common laser platform 20 includes a gain module 50. It will be readily apparent to one of ordinary skill in the art that the gain module 50 may incorporate any known gain medium, such as, for example, semiconductor, rare-earth doped fiber or waveguide, doped solid-state or Raman amplifiers. It is presently preferred that the gain module 50 is based on a single stage amplifier. It will be readily apparent to one of ordinary skill in the art, however, that the gain module 50 may be based on multiple stage amplifiers arranged in series or parallel, as shown in FIGS. 2(a) and 2(b), in order to extend the emission spectral range and/or to increase the optical output power of the laser source 10.

In the presently preferred embodiment, the common laser platform 20 also includes a pump module 60. The pump module 60 supplies energy to the gain module 50 necessary to achieve sustainable laser action. It will be readily apparent to one of ordinary skill in the art that different gain media may require different specific pump mechanisms to attain gain. Also, the pump module 60 can be arranged according to a pump redundancy scheme. In the presently preferred embodiment, the pumping mechanisms provided by the pump module 60 to gain module 50 are either optical or electric current pump mechanisms. It will be readily apparent to one of ordinary skill in the art, that depending on the gain medium, the pump module 60 may comprise single or multiple pump lasers, current strips, high-voltage electrodes or discharge lamps.

In the presently preferred embodiment, the common laser platform 20 of the laser source 10 also includes a feedback module 70. The feedback module 70 ensures the existence of a proper feedback mechanism for the laser radiation thus establishing an efficient optical resonator. It will be readily apparent to one of ordinary skill in the art that proper feedback can be achieved by single or multiple highly reflective mirrors with either a broad or narrow-band spectral response. Also, the spectral response of reflective mirrors can be tunable by mechanical or electrical means.

In the presently preferred embodiment, the common laser platform 20 of the laser source 10 also includes an output coupler module 80. The output coupler module 80 is used to provide a useful output from the laser source 10. In the presently preferred embodiment, the coupling ratio of the output coupler module 80 is selected to optimize the characteristics of the optical output beam. It will be readily apparent to one of ordinary skill in the art that optimized output coupling can be attained with partially transmissive mirrors or beam splitters with either a broad or narrow-band spectral response. Also, the spectral response and/or coupling ratio of partially transmissive mirrors or beam splitters can be tunable by mechanical or electrical means.

In another embodiment of the invention, the output coupler module 80 may comprise means to provide a laser source 10 with multiple output beams with either identical or distinct characteristics. These means to obtain multiple output beams with identical or distinct characteristics may, for example, be one or more beam splitters, wavelength division multiplexers and/or demultiplexers, resonant or periodic filters, polarization beam splitters, or spatial division multiplexers and/or demultiplexers.

In the presently preferred embodiment, the common laser platform 20 of the laser source 10 also includes a connection module 40. The connection module 40 provides means for a robust, reliable and flexible optical, electrical and/or mechanical detachable connection between the plug-in module 30 and the common laser platform 20. This connection may be either optically, electrically and/or mechanically unidirectional or bi-directional. It will be readily apparent to one of ordinary skill in the art that a robust, reliable and flexible optical detachable connection can be attained by an optical fiber or waveguide connector or by an open optical air path. Also, a robust, reliable and flexible electrical detachable connection can be attained by an electrical signal or power connector. Similarly, a robust, reliable and flexible mechanical detachable connection can be attained by a mechanical connector.

In the presently preferred embodiment, the laser source 10 includes a plug-in module 30. The plug-in module 30 is connected through a detachable connection, provided by the connection module 40, to the common laser platform 20. In the presently preferred embodiment, the plug-in module 30 is preferably a simple and low cost device that incorporates, according to FIGS. 3(a) and 3(b), the means required to define and control one or more optical characteristics of the beam output by the laser source 10. Such means to define and control one or more optical output beam characteristics are illustrated by a set of individual control elements each defining and controlling one of the output beam characteristics, in the case of FIG. 3(a), or by a single multifunctional control element 90 capable of simultaneously defining and controlling more than one output beam characteristic in the case of FIG. 3(b).

Figure 3A:
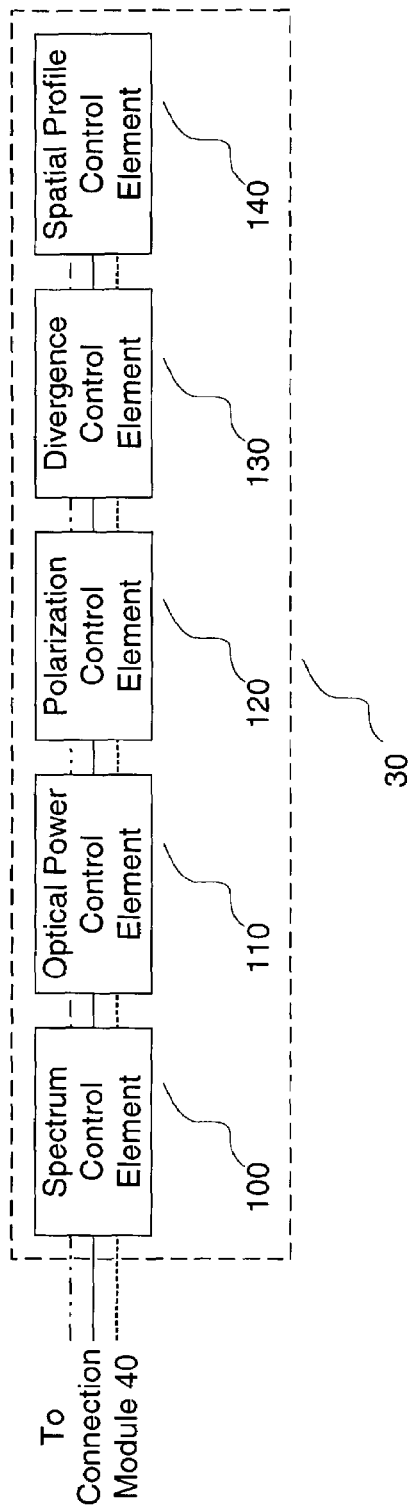
FIGS. 3(a) and 3(b) are schematic diagrams of a presently preferred embodiment of a plug-in module according to the present invention, with FIG. 3(a) showing a plug-in module including a set of individual control elements, and with FIG. 3(b) showing a plug-in module including a single multifunctional control element.
Figure 3B:
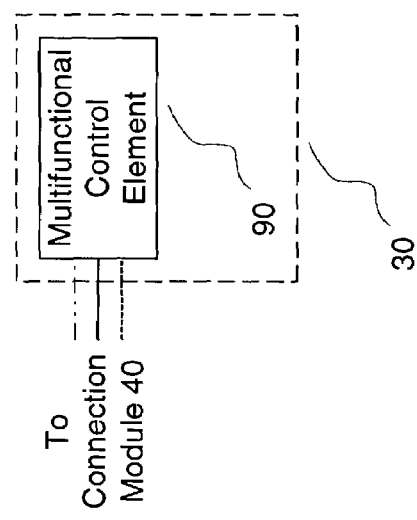

In FIG. 3(a) the individual control elements are a spectrum control element 100 to define and control the emission spectrum of the output beam, an optical power control element 110 to define and control the output beam optical power, a polarization control element 120 to define and control the output beam polarization state, a divergence control element 130 to define and control the output beam divergence, and a spatial profile control element 140 to define and control the spatial profile of the output beam. While for the sake of illustration a specific series arrangement and order of the control elements is shown, it will be readily apparent to one of ordinary skill in the art that these control elements may be placed within the plug-in module 30 in arrangements other than those shown, differing from that shown in order or in parallel and/or series arrangements other than those shown. It will be readily apparent to one of ordinary skill in the art that the functions of these elements may be performed by any of various devices known in the art, namely: spectral filters, gratings, thin film coatings, prisms, attenuators, beam splitters, partially reflective mirrors, polarizers, polarization beam splitters, quarter and half-wavelength waveplates, Faraday rotators, lenses, pinholes, iris and waveguides. These elements may be passive or active in terms of their optical characteristics. As an illustrative example, one specific arrangement of such components within a plug-in module 30 would be a thin film coated transmission filter to define and control the emission spectrum of the output beam optically connected to a neutral density filter to define and control the output beam optical power optically connected to a polymer polarizing film to define and control the output beam polarization state optically connected to a spherical plano-convex lens to define and control the output beam divergence optically connected to an iris diaphragm to define and control the spatial profile of the output beam. It will be readily apparent to one of ordinary skill in the art that the plug-in module 30 structure provides the required mechanical fitting to properly maintain the optimum alignment of the different components.

In another preferred embodiment, a multifunctional control element 90 may define and control more than one output beam characteristics. It will be readily apparent to one of ordinary skill in the art that the multiple functions of this multifunctional control element 90 may be performed by any devices known in the art, such as, for example, a narrow-band polarization sensitive partially transmissive spherical mirror that allows the simultaneous definition and control of the emission spectrum, the polarization state, the optical power and beam divergence of the output beam.

In the presently preferred embodiment, the optical resonator of the laser source 10 includes the output coupler module 80 and the plug-in module 30. For the linear cavity configuration depicted in FIG. 1(a), the plug-in module 30 has optical reflective characteristics, while for the ring cavity configuration depicted in FIG. 1(b), the plug-in module has optical transmissive characteristics.

Figure 4A:
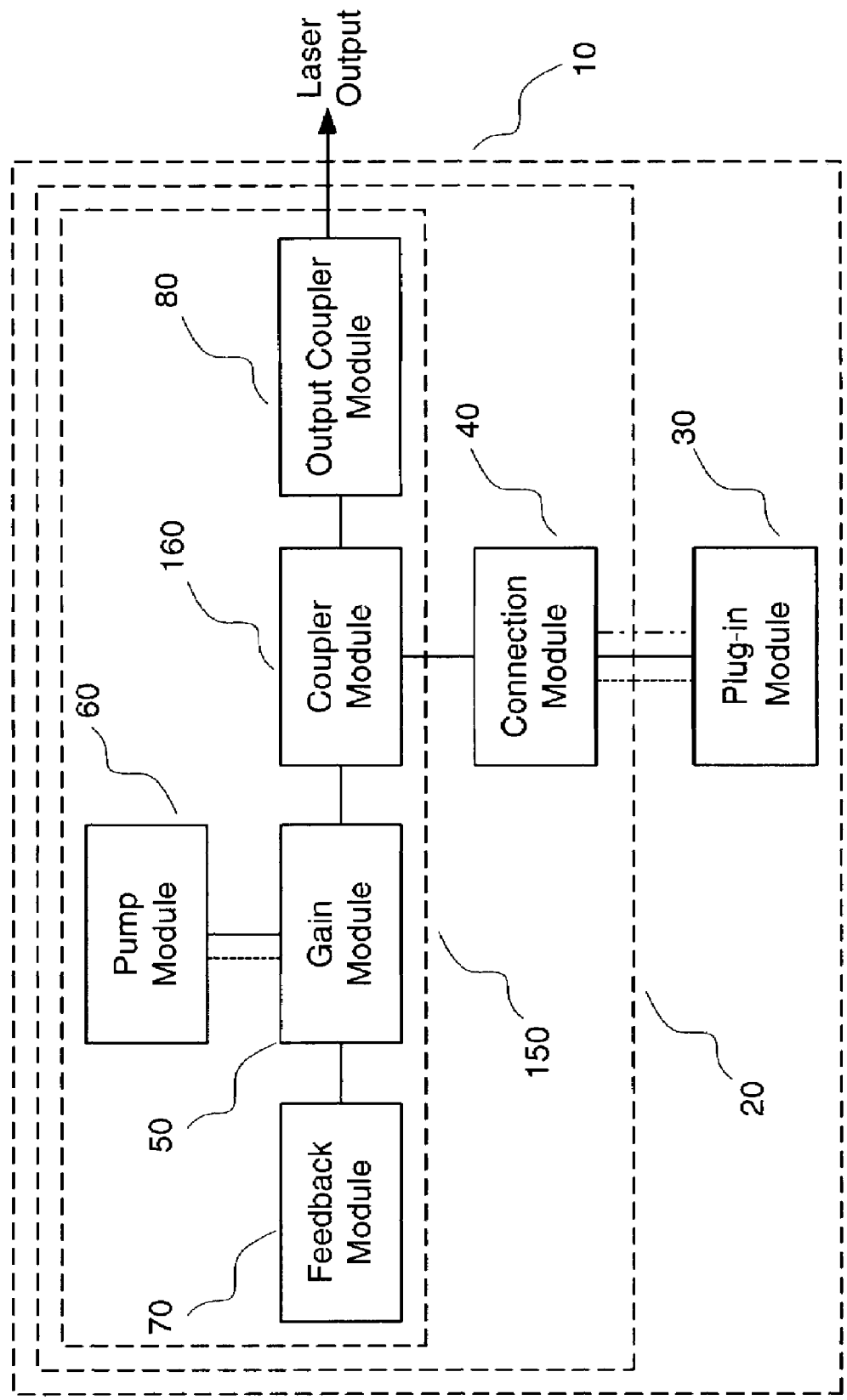
FIGS. 4(a) and 4(b) are schematic diagrams of a presently preferred embodiment of a laser source, with FIG. 4(a) showing a laser source in a linear cavity configuration and with a plug-in module external to a primary laser resonator, and with FIG. 4(b) showing a laser source in a ring cavity configuration with a plug-in module external to a primary laser resonator.
Figure 4B:
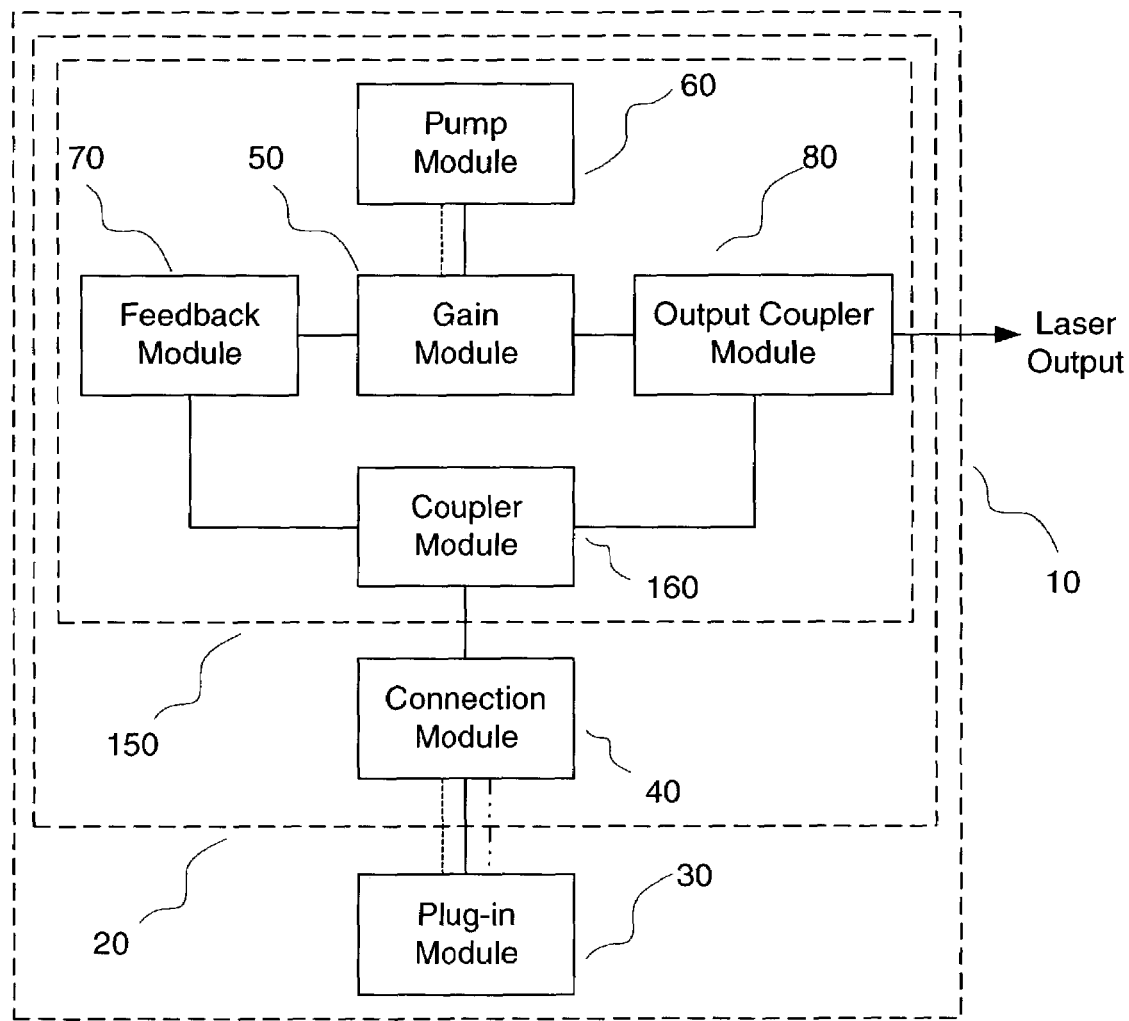
Figure 5A:
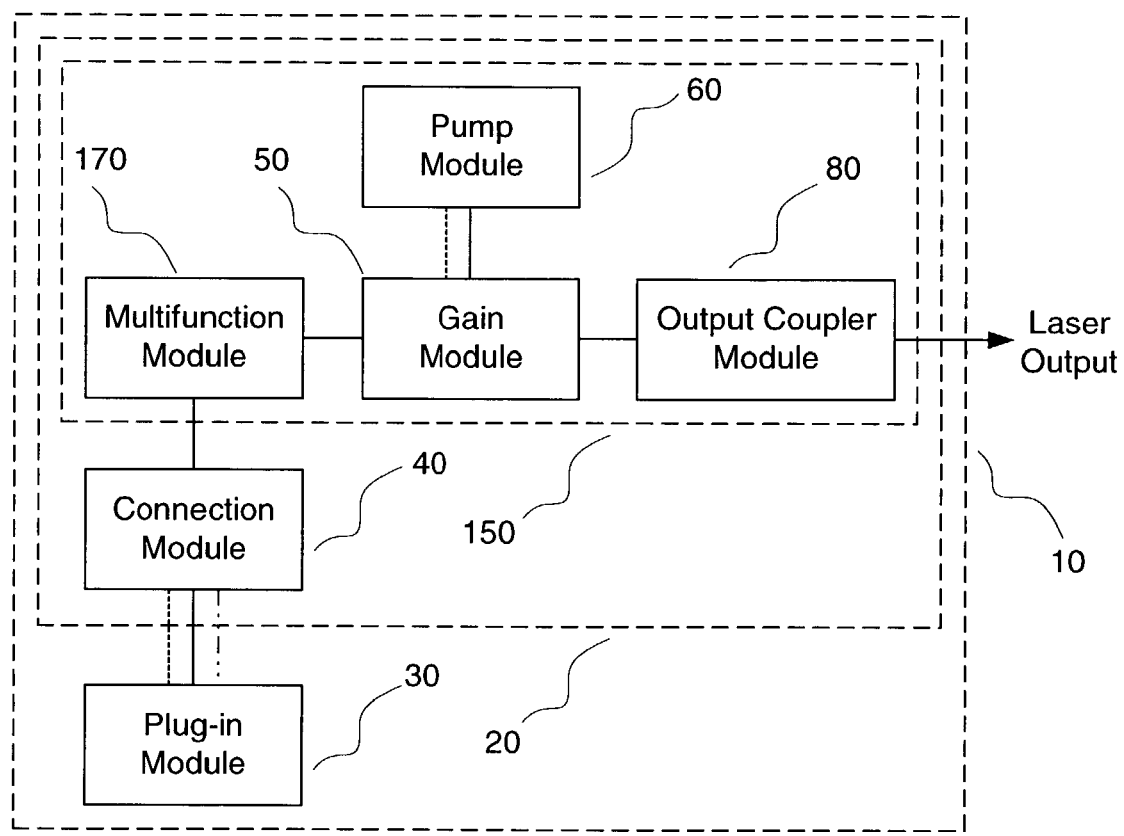
FIG. 5(a) is a schematic diagram of a presently preferred embodiment of a laser source according to the present invention, in a linear cavity configuration with a multifunction module that incorporates the functions of a coupler and a feedback module.
Figure 5B:
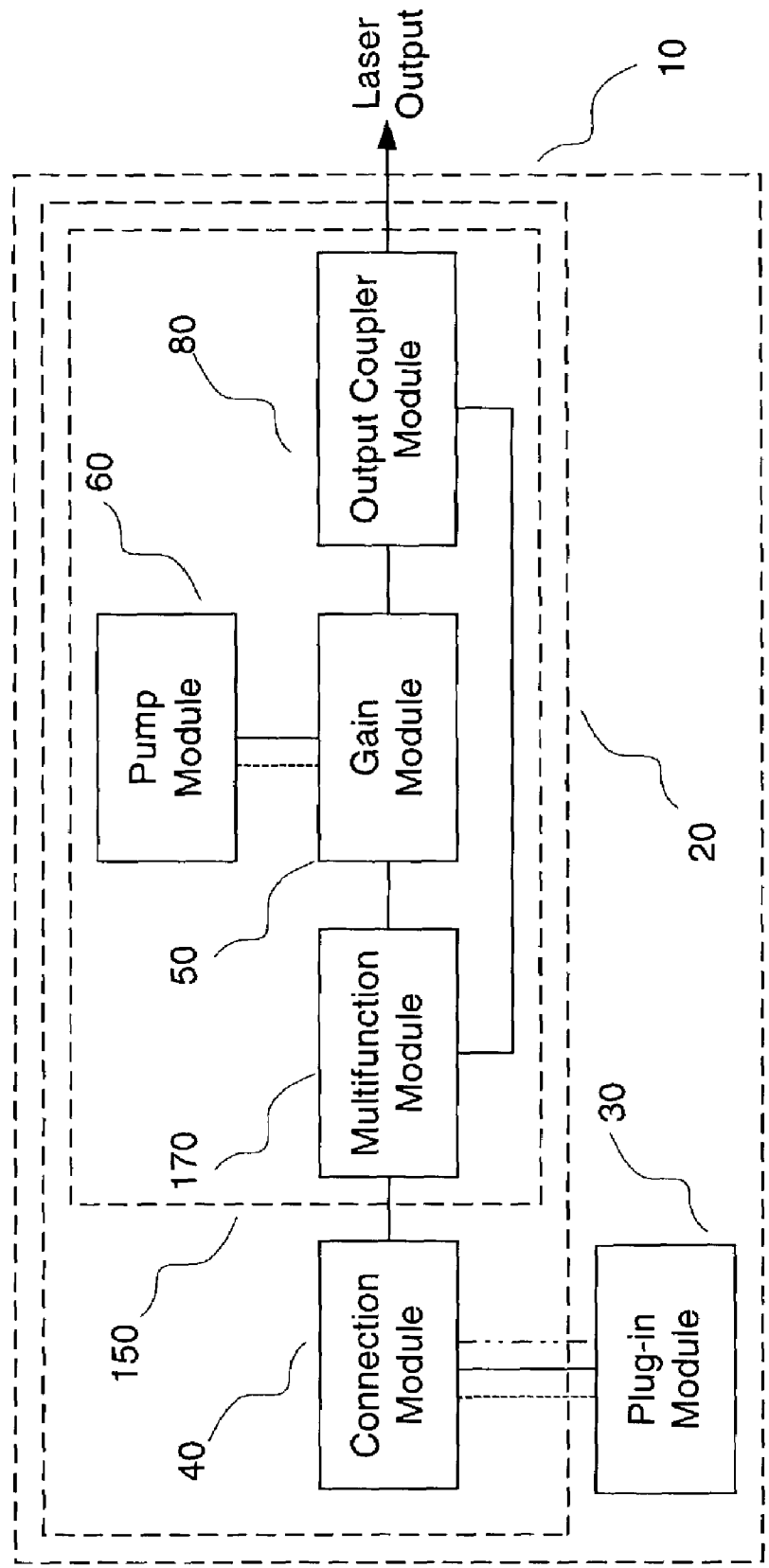
FIG. 5(b) is a schematic diagram of a presently preferred embodiment of a laser source according to the present invention, in a ring cavity configuration with a multifunction module that incorporates the functions of a coupler and a feedback module.
Figure 5C:
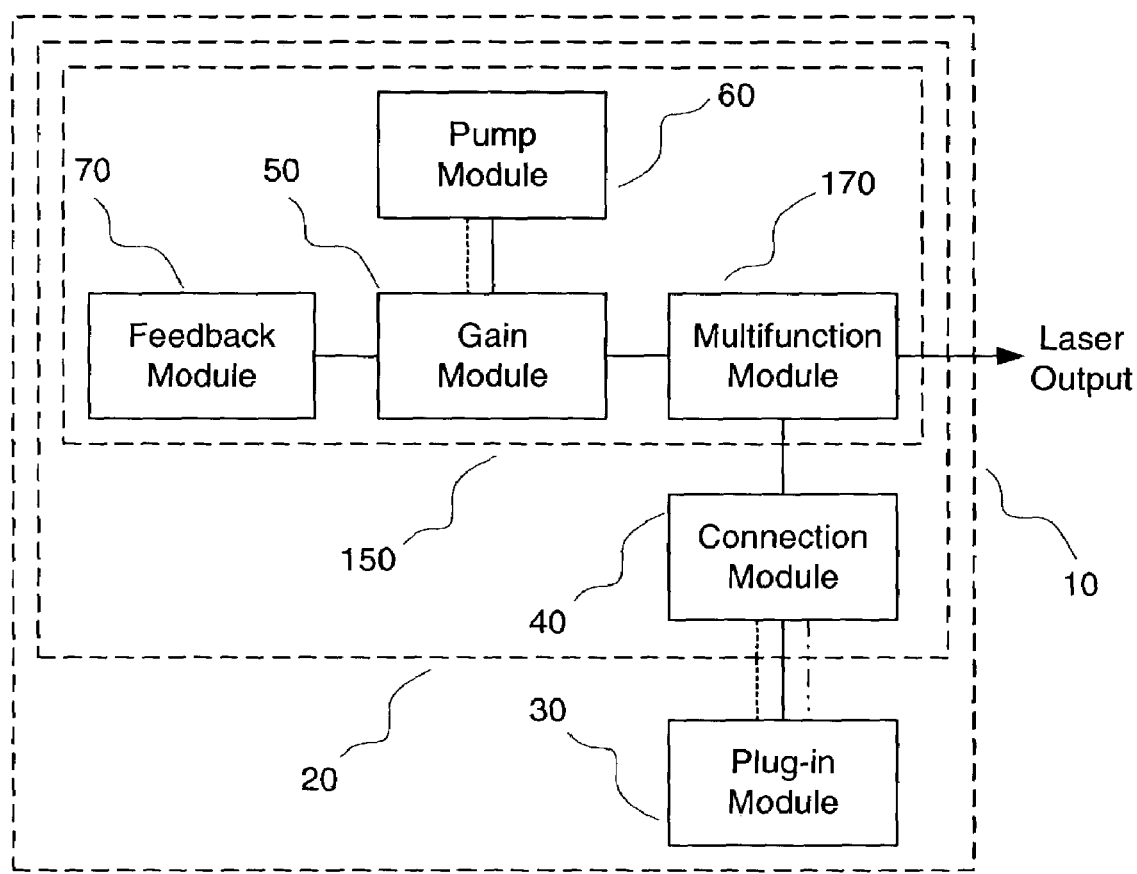
FIG. 5(c) is a schematic diagram of a presently preferred embodiment of a laser source according to the present invention, in a linear cavity configuration with a multifunction module that incorporates the functions of a coupler and an output coupler module.
Figure 5D:
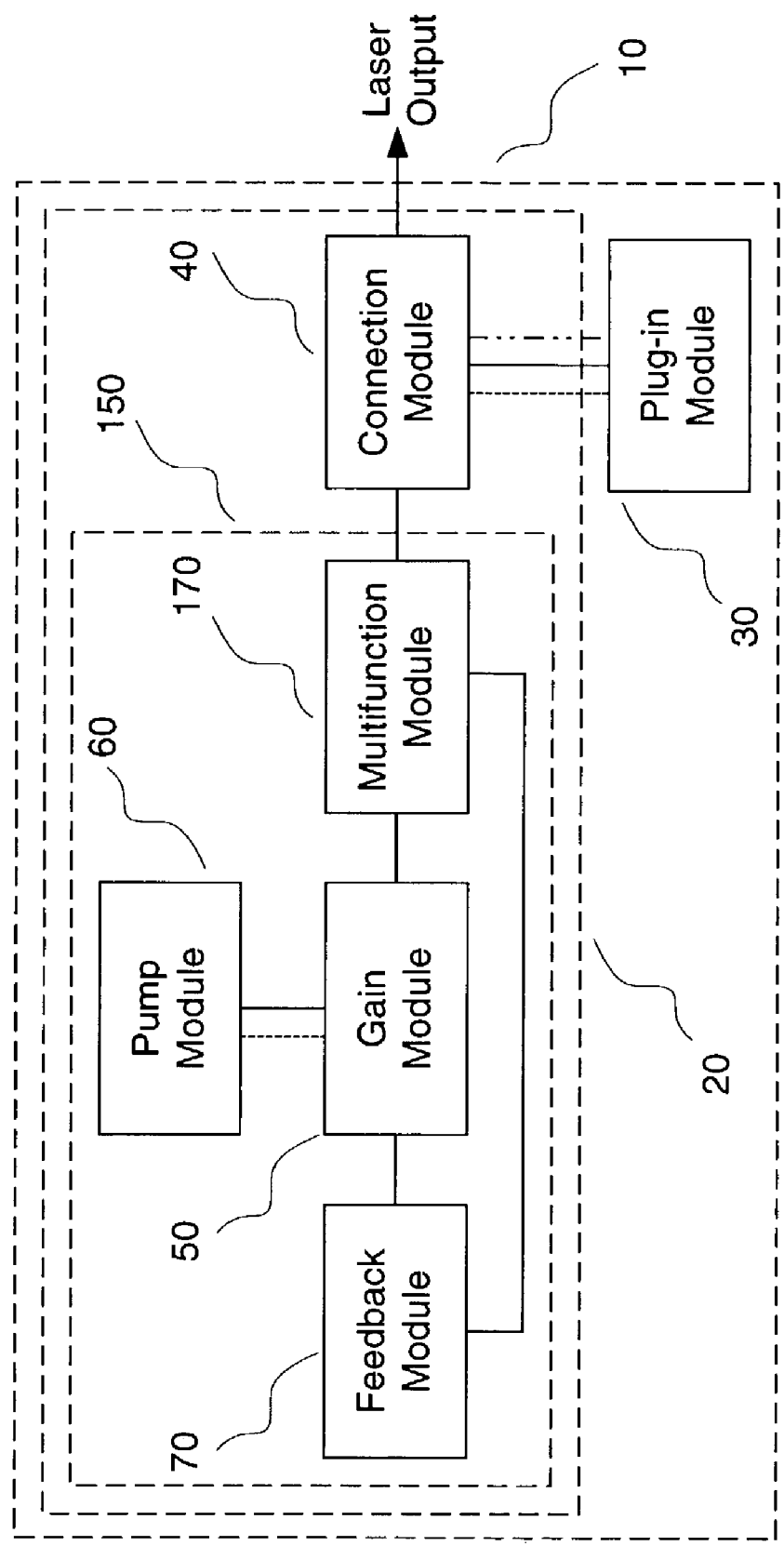
FIG. 5(d) is a schematic diagram of a presently preferred embodiment of a laser source according to the present invention, in a ring cavity configuration with a multifunction module that incorporates the functions of a coupler and an output coupler module.

In another preferred embodiment of the invention, as illustrated in FIGS. 4(a) and 4(b), the plug-in module 30 is placed externally to the primary laser resonator 150 of the laser source 10 defining a coupled cavity configuration. The coupler module 160 enables optical coupling between the primary laser resonator 150 and the plug-in module 30 through the connection module 40. It will be readily apparent to one of ordinary skill in the art that the coupler module 160 may be a beam splitter, a partial reflector or a polarization beam splitter.

In another embodiment of the invention, either the feedback module 70 or the output coupler module 80 additionally includes the coupler module 160 functionality illustrated in FIGS. 5(a)–5(d), defining a multifunction module 170. It will be readily apparent to one of ordinary skill in the art that this multifunction module 170 may be a beam splitter, a partial reflector or a polarization beam splitter.

Figure 6B:
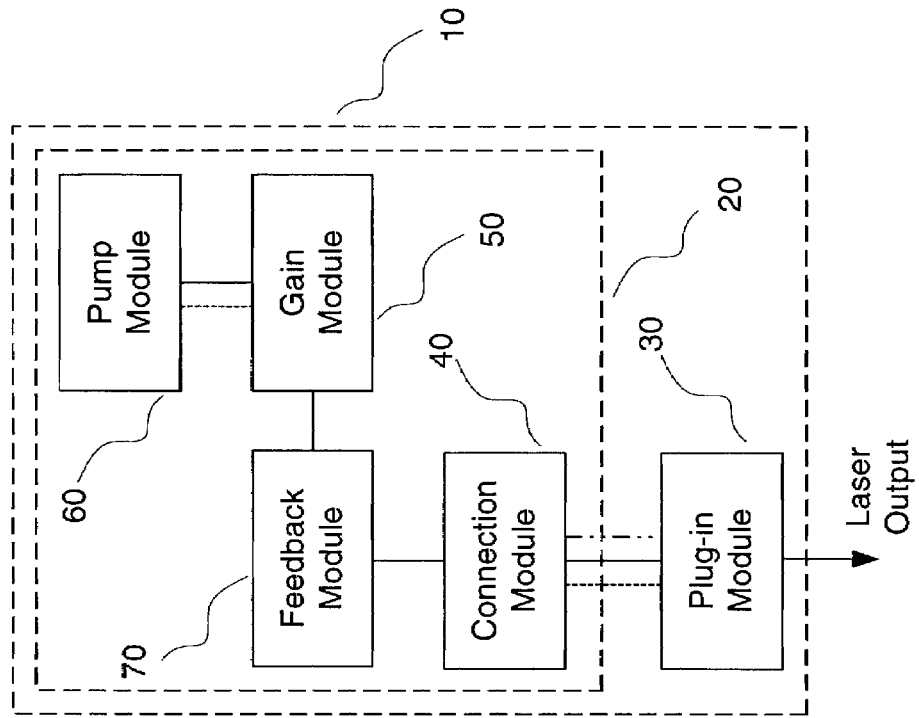
Figure 6A:
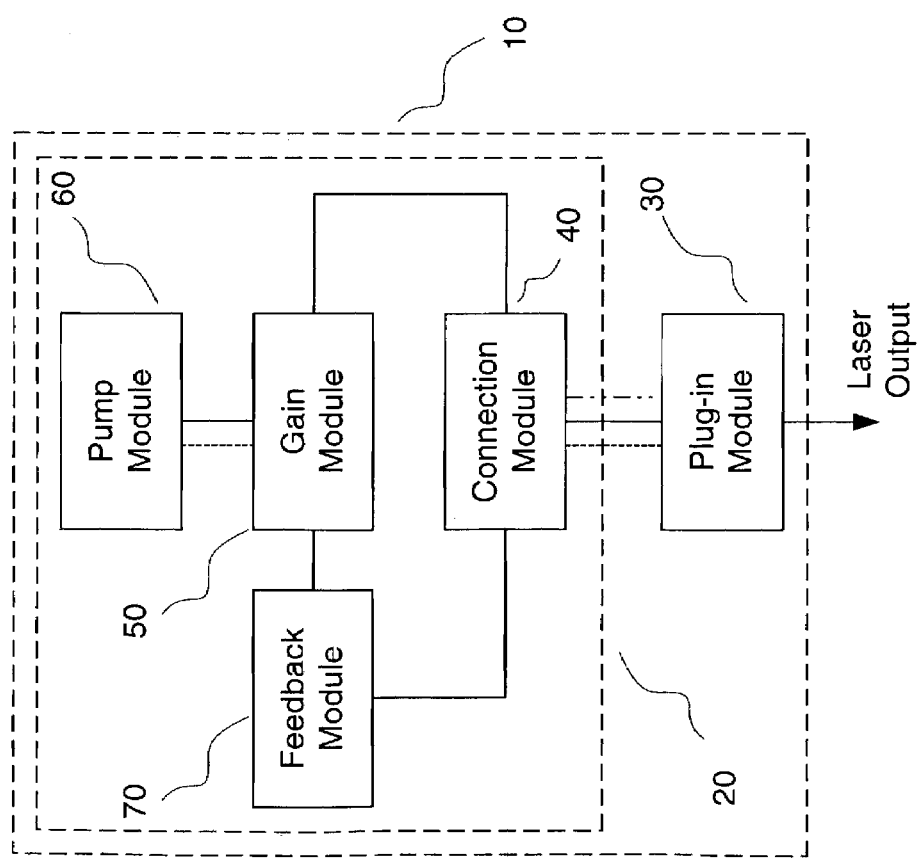

In another embodiment of the invention, the plug-in module 30 additionally includes the output coupler 80 functionality, as depicted on FIGS. 6(a) and 6(b), thus providing a useful output for the laser source 10 and further rendering optional the use of the output coupler module 80 within the common laser platform 20. It will be readily apparent to one with ordinary skill in the art that this functionality can also be achieved with the additional inclusion, within the plug-in module 30, of a beam splitter or, a partially reflective and/or partially transmissive element. Additionally the plug-in module 30 may further comprise means to obtain multiple output beams with identical or distinct characteristics. These means to obtain multiple output beams with identical or distinct characteristics may include, for example, one or more additional elements, such as beam splitters, wavelength division multiplexers and/or demultiplexers, resonant or periodic filters, polarization beam splitters, spatial division multiplexers and/or demultiplexers.

Figure 7A:
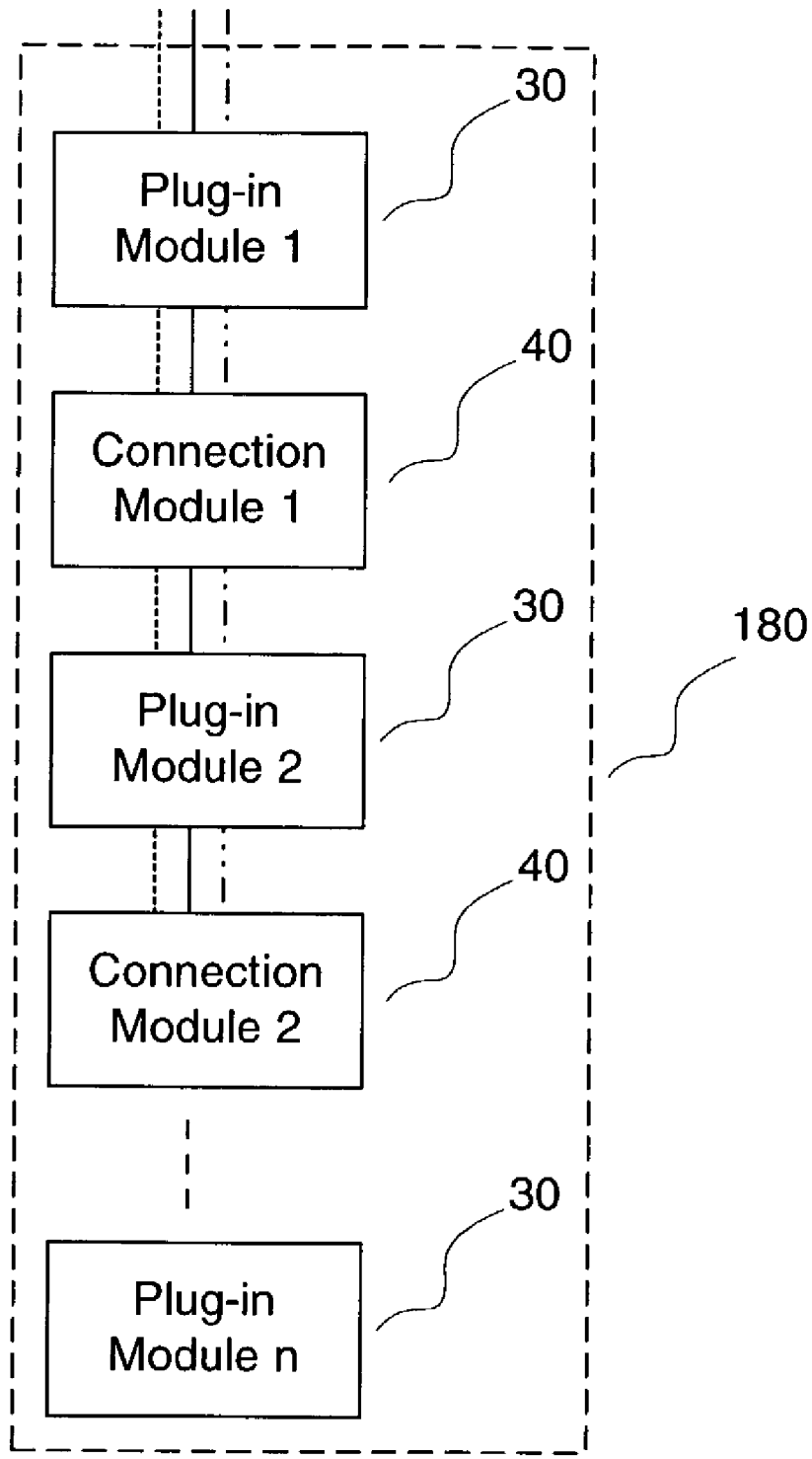
FIG. 7(a) is a schematic diagram of a presently preferred embodiment of a serial set of plug-in modules according to the present invention.
Figure 7B:
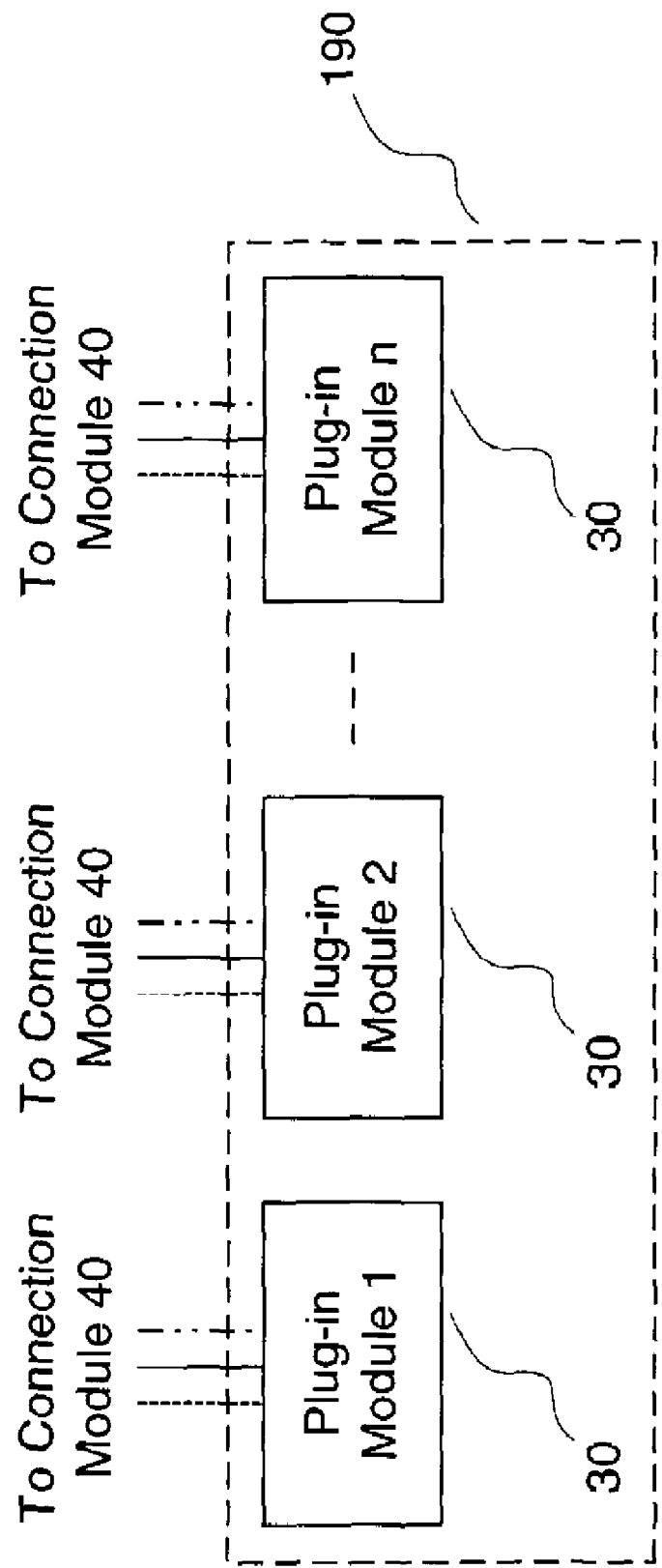
FIG. 7(b) is a schematic diagram of a presently preferred embodiment of a parallel set of plug-in modules according to the present invention.

In another embodiment of the invention, a set of plug-in modules 30, arranged in a serial or parallel configuration, according to FIGS. 7(a) and FIG. 7(b), respectively, are used to define and control the laser source 10 output beam characteristics. Such an embodiment further extends the concept of a laser source with an adaptable output beam characteristic. Each plug-in module 30, within the serial set 180 and within the parallel set 190, independently defines and controls one or more relevant output beam characteristics of laser source 10. In the presently preferred embodiments, the connection module 40 provides a robust, reliable and flexible optical, electrical and/or mechanical connection between consecutive plug-in modules 30 within the serial set 180, between the serial set 180 and the common laser platform 20, and between each plug-in module 30 within the parallel set 190 and the common laser platform 20. This connection may be either optically, electrically and mechanically unidirectional or bi-directional.

In the presently preferred embodiments, the serial set 180 and the parallel set 190 of plug-in modules 30 comprises one plug-in module 30 per output beam characteristic, thus permitting each particular output beam characteristic of the laser source 10 to be independently defined and controlled over its entire range. It will be readily apparent to one with ordinary skill in the art that such a configuration allows the laser source 10 to be operated over a broad range of possible operation conditions, by means of a large number of different combinations of a small number of individual plug-in modules 30.

Figure 8A:
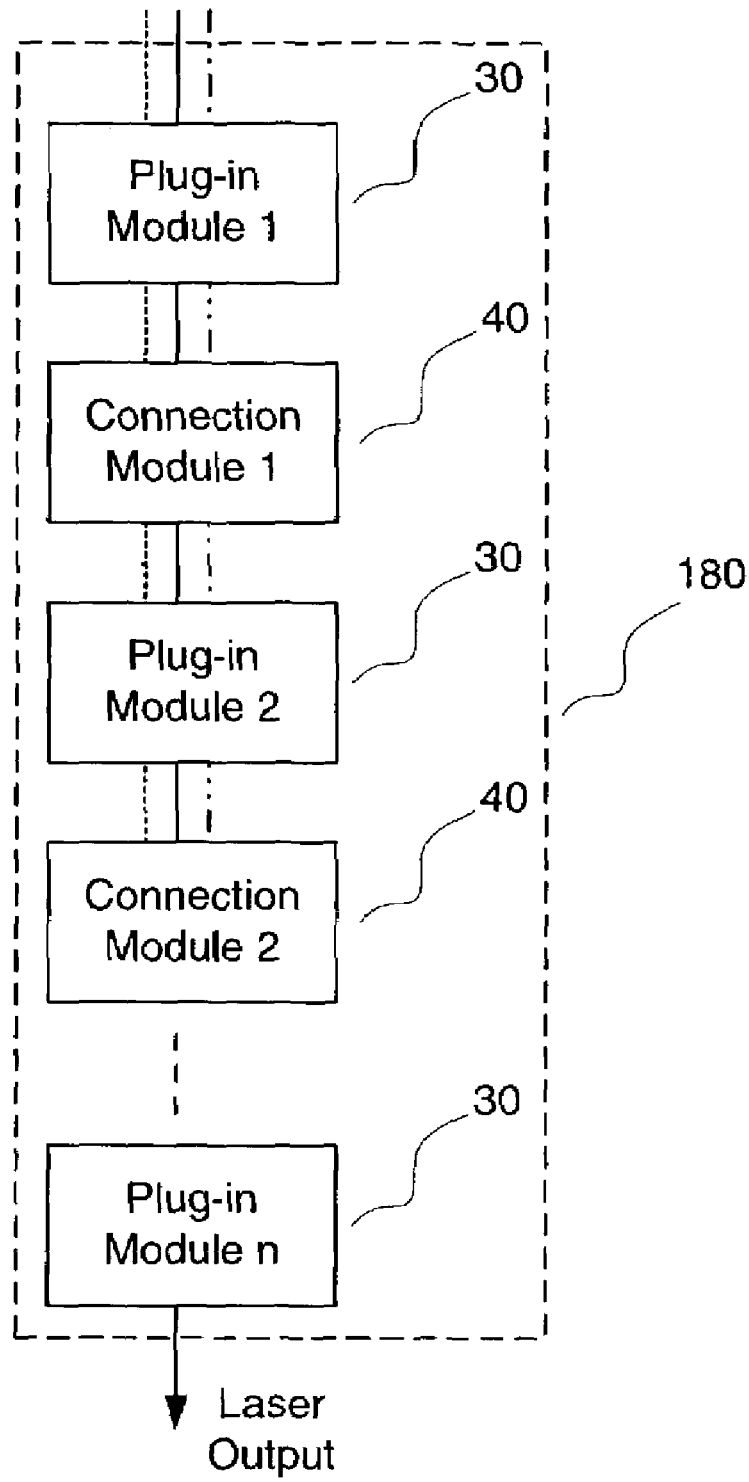
FIG. 8(a) is a schematic diagram of a presently preferred embodiment of a serial set of plug-in modules with a useful laser output according to the present invention.
Figure 8B:
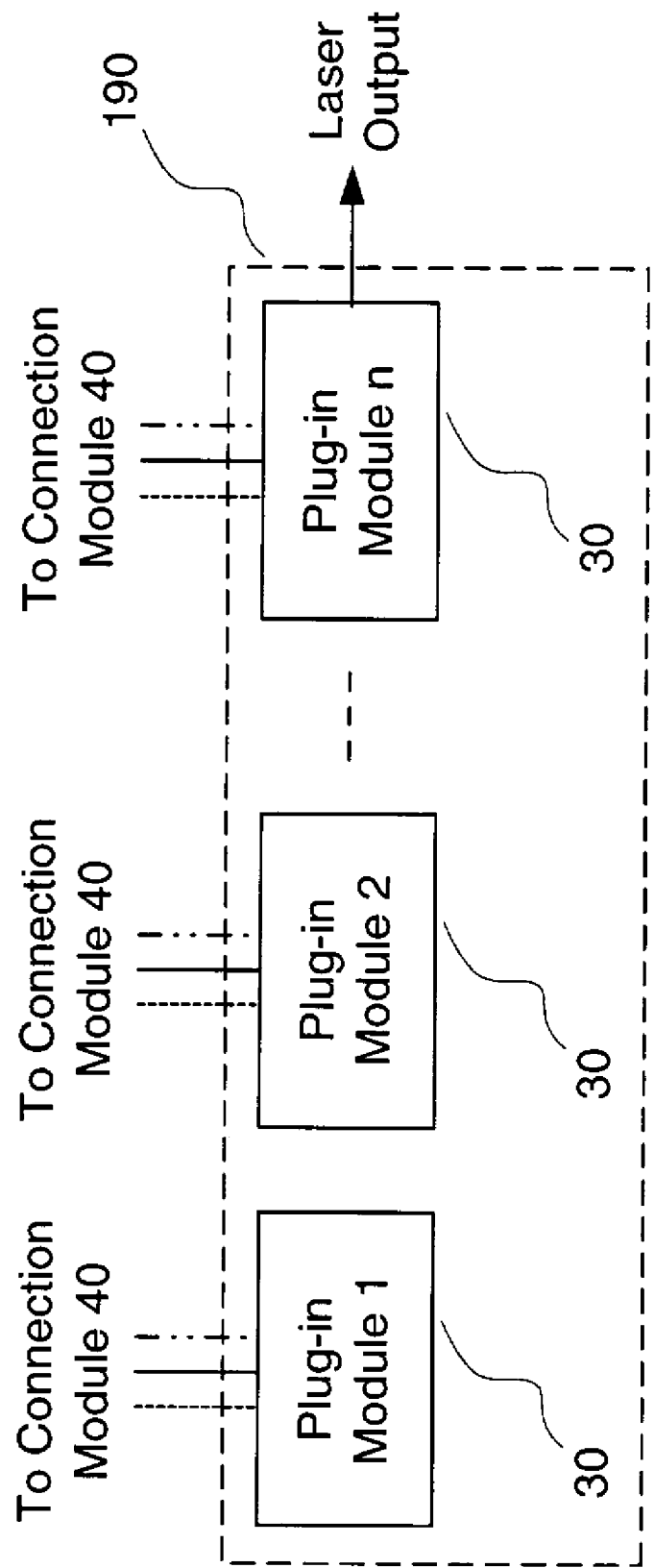
FIG. 8(b) schematic diagram of a presently preferred embodiment of a parallel set of plug-in modules with a useful laser output according to the present invention.

In other embodiments of the invention, the serial set 180 and the parallel set 190 of plug-in modules 30 additionally includes the output coupler 80 functionality, as illustrated in FIGS. 8(a) and 8(b), respectively, thus providing a useful output for the laser source 10 and further rendering optional use of the output coupler module 80 within the common laser platform 20. It will be readily apparent to one with ordinary skill in the art that this functionality can also be achieved with the additional inclusion, within the plug-in module 30, of a beam splitter or, a partially reflective and/or partially transmissive element.

Figure 9A:
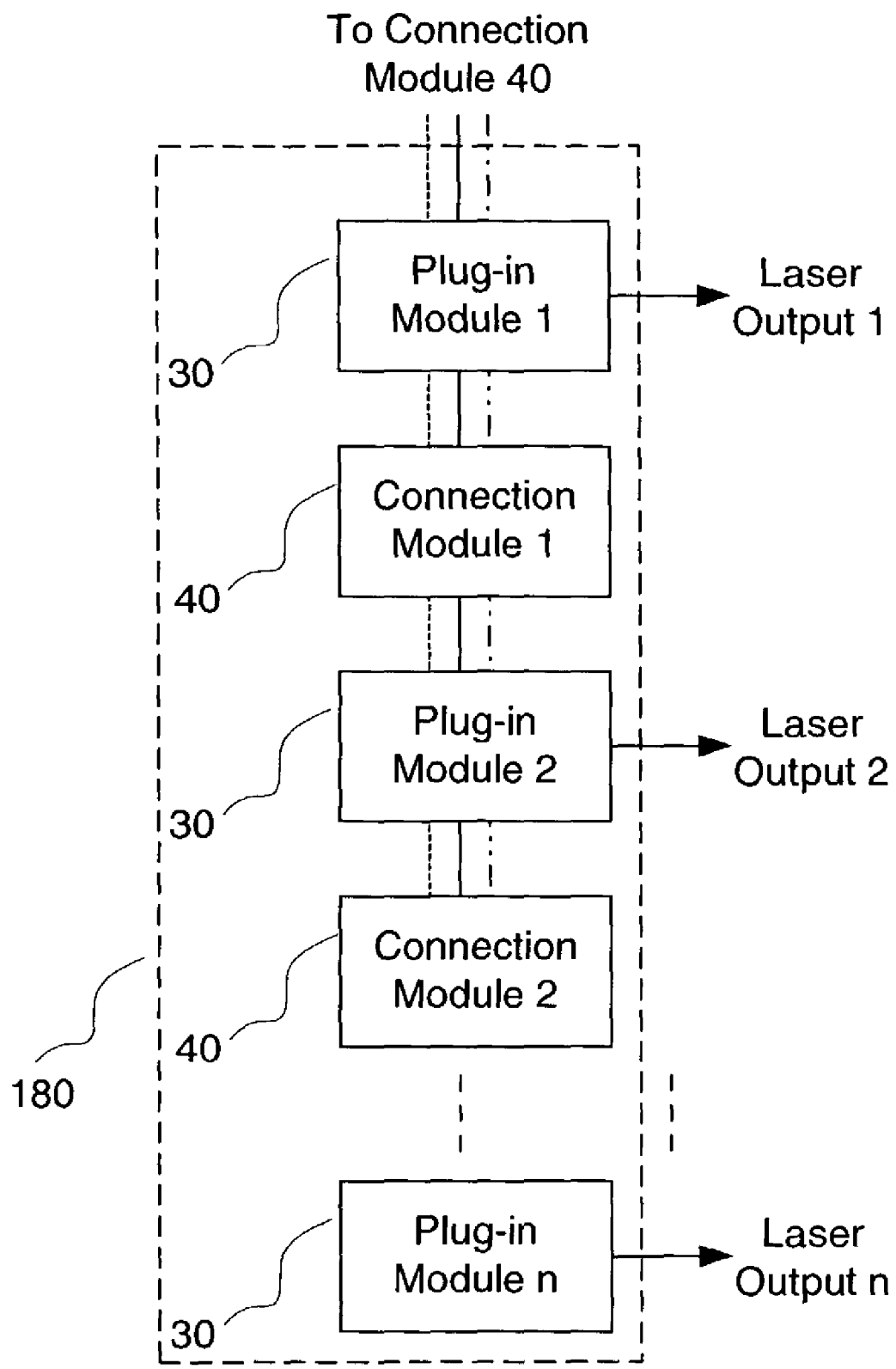
FIG. 9(a) is a schematic diagram of a presently preferred embodiment of a serial set of plug-in modules with multiple useful laser outputs according to the present invention.
Figure 9B:
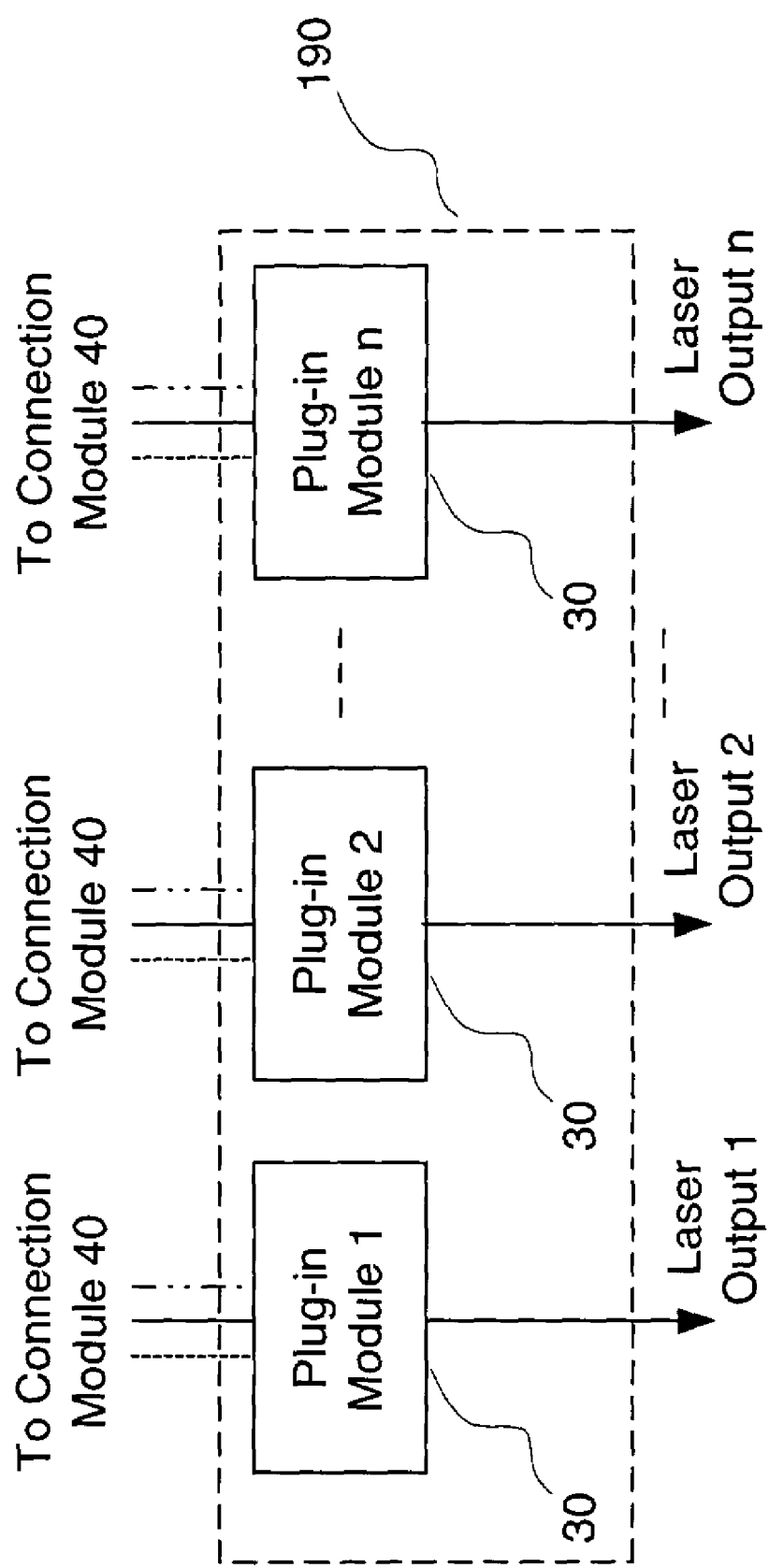
FIG. 9(b) is a schematic diagram of a presently preferred embodiment of a parallel set of plug-in modules with multiple useful laser outputs according to the present invention.

In another embodiment of the invention, the serial set 180 and the parallel set 190 of plug-in modules 30 may comprise means to obtain multiple output beams with identical or distinct characteristics. These means to obtain multiple output beams with identical or distinct characteristics may include at least one plug-in module 30 with the means to provide multiple output beams, as illustrated in FIGS. 9(a) and 9(b), for the serial set 180 and the parallel set 190, respectively. However, the means to provide multiple output beams are not limited to that configuration and may be achieved by any of the other means known in the art.

In all described embodiments of the invention, the apparatus comprising a combination of the common laser platform 20 and the plug-in module 30, properly interconnected through the connection module 40, constitutes a laser source 10 with stable and well-defined output beam characteristics. These characteristics may be modified on demand by simple replacement of the appropriate plug-in module 30.

As mentioned above, a DWDM telecommunication system is one well-known example of an application that requires a laser source emitting at different wavelengths in either a single output comprising all wavelength channels, or multiple outputs each addressing an individual wavelength channel. The laser source 10 with adaptable output beam characteristics of the present invention is a suitable source for this application, because a demand to modify the emission characteristics of a particular wavelength channel would require only the replacement of the corresponding plug-in module 30. FIGS. 10–14 illustrate a fiber-optic ring laser system for use, for example, in a DWDM telecommunication system. One of ordinary skill in the art recognizes that such a system may be alternatively implemented in a linear laser resonator configuration as described above.

Figure 10:
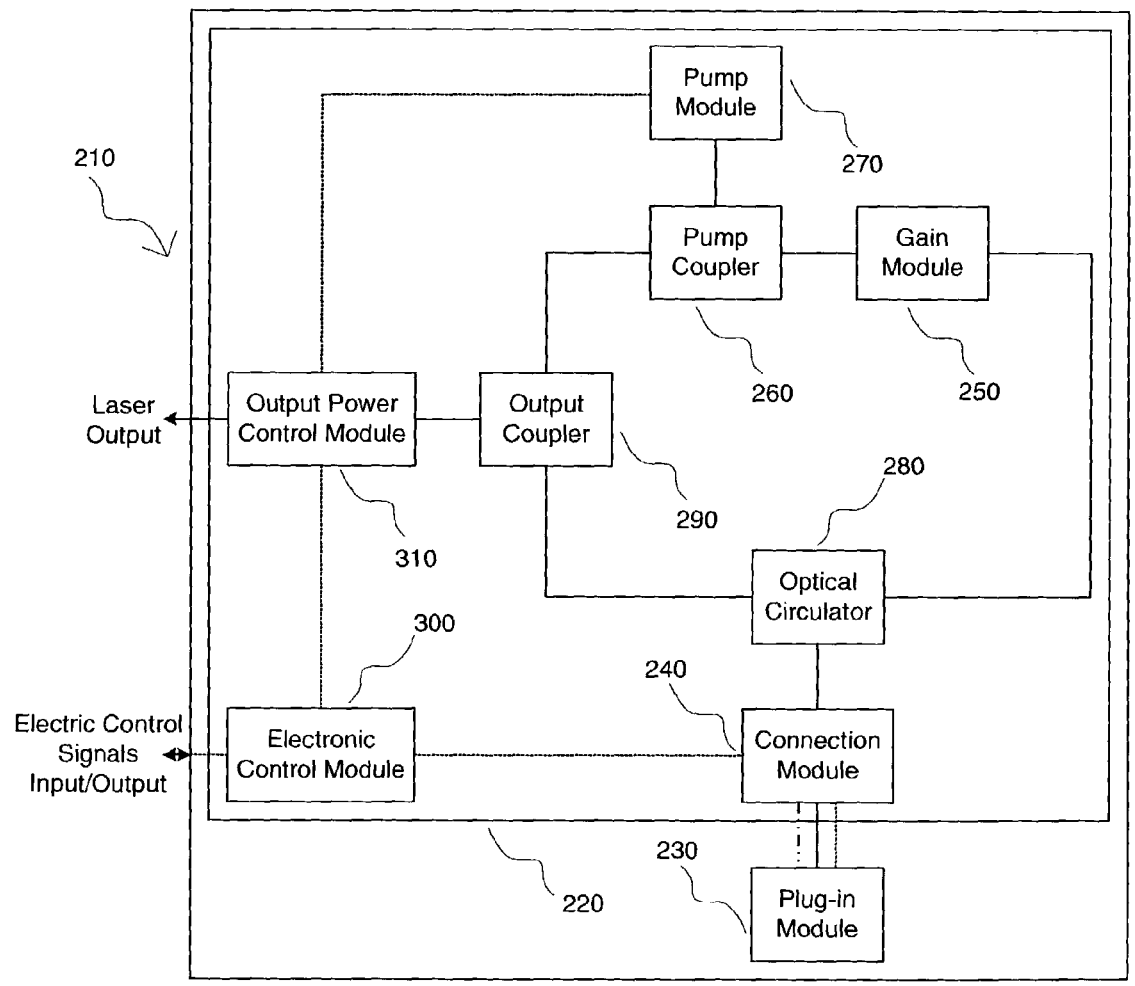
FIG. 10 is a schematic diagram of a presently preferred embodiment of a fiber-optic ring laser, with configurable optical emission spectrum characteristics, according to the present invention.

FIG. 10 is a schematic diagram of a presently preferred configuration for a fiber-optic ring laser 210 according to the present invention. The configuration includes several cavity elements, as described below. While for the sake of illustration a specific ordering of elements is shown for the ring configuration described immediately below, it will be readily apparent to one of ordinary skill in the art that cavity elements may be placed within the cavity according to different positions other than those shown and described.

Fiber-optic ring laser 210 comprises two major blocks: the common fiber laser platform 220 and the plug-in module 230. The connection between the two blocks is assured by means of a connection module 240 included in the common fiber laser platform 220. The common fiber laser platform 220 does not compromise the fiber laser 210 to a specific set of optical emission spectrum characteristics, rather it provides a common base suitable to attain a broad range of optical emission spectrum characteristics. The specific optical emission spectrum characteristics of fiber laser 210 required for a particular application are defined and controlled by the plug-in module 230. Particular optical emission spectrum characteristics include, but are not limited to central frequency, spectral-width, and spectral structure.

The common fiber laser platform 220 includes a gain module 250. It is presently preferred that this gain module 250 be made up of a length of rare earth doped optical fiber. More preferably, the gain module 250 includes a length of erbium-doped optical fiber. It will, however, be apparent to one of ordinary skill in the art that other rare earth and transition metal materials may be used as dopants or co-dopants of the optical fiber in the gain module 250, in concentrations which may vary across the radial and/or longitudinal profile of the fiber. It will also be apparent to one of ordinary skill in the art that gain module 250 may be made up of other optical amplifiers such as, but not limited to semiconductor optical amplifier, fiber Raman amplifier, rare-earth doped waveguide amplifier, or doped solid-state amplifier. Also, supplementary gain modules can be added to the fiber laser 210 in series or parallel with the gain module 250 in order to extend the frequency operating range and/or to increase the optical output power of the fiber laser 210.

Pump coupler 260 is used to couple the output of the pump module 270 into the fiber laser 210. It is presently preferred that the coupler 260 be a fiber-fused wavelength division multiplexer coupler which couples the optical radiation from the pump module 270 into the fiber laser 210. However, coupling the pump laser light radiation into the fiber laser 10 is not limited to this method and may be achieved by any of several other methods known in the art. The pump module 270 may be any one of many commonly available pump laser sources, including an array of pump laser diodes arranged according to a pump redundancy scheme. In the presently preferred embodiment, the pump module 270 comprises a laser diode providing either co- or counter-propagating pump radiation into gain module 250.

The gain module 250 is optically coupled to a three port optical circulator 280. Here and elsewhere, "optically coupled" means arranged so that optical radiation may pass from one to the other or vice versa, and possibly passing through one or more active or passive intermediate optical elements along the way. It is readily apparent to one of ordinary skill in the art that the electrical interconnecting path can be defined by electric conductor, semiconductor, or any other electrical connection know in the art, and the mechanical interconnecting path can be defined by a transducer or any other mechanical connection known in the art. It is readily apparent to one of ordinary skill in the art that these connections between different modules are arranged so that optical radiation, electric current, and mechanical action may pass from one to the other or vice versa, possibly passing through one or more active or passive intermediate optical, electrical, or mechanical elements along the way. These connections enable optimized operation of fiber laser 210.

The optical circulator 280 optically connects the gain module 250 to the connection module 240. The connection module 240 provides means for a robust, reliable, and flexible optical and/or electrical and mechanical detachable connection between the plug-in module 230 and the common fiber laser platform 220. This connection may be either optically, electrically, and mechanically unidirectional or bi-directional. In the presently preferred embodiment, an optical fiber connector can attain a robust, reliable and flexible optical detachable connection. It is readily apparent to one of ordinary skill in the art that such type of optical connection can be attained by any of other methods known in the art such as, but not limited to a waveguide connector, a pair of grin lenses, or an open optical air path. Also, in the presently preferred embodiment, an electrical signal/power connector can attain a robust, reliable, and flexible electrical detachable connection. Similarly, a mechanical connector can attain a robust, reliable and flexible mechanical detachable connection.

Figure 11:
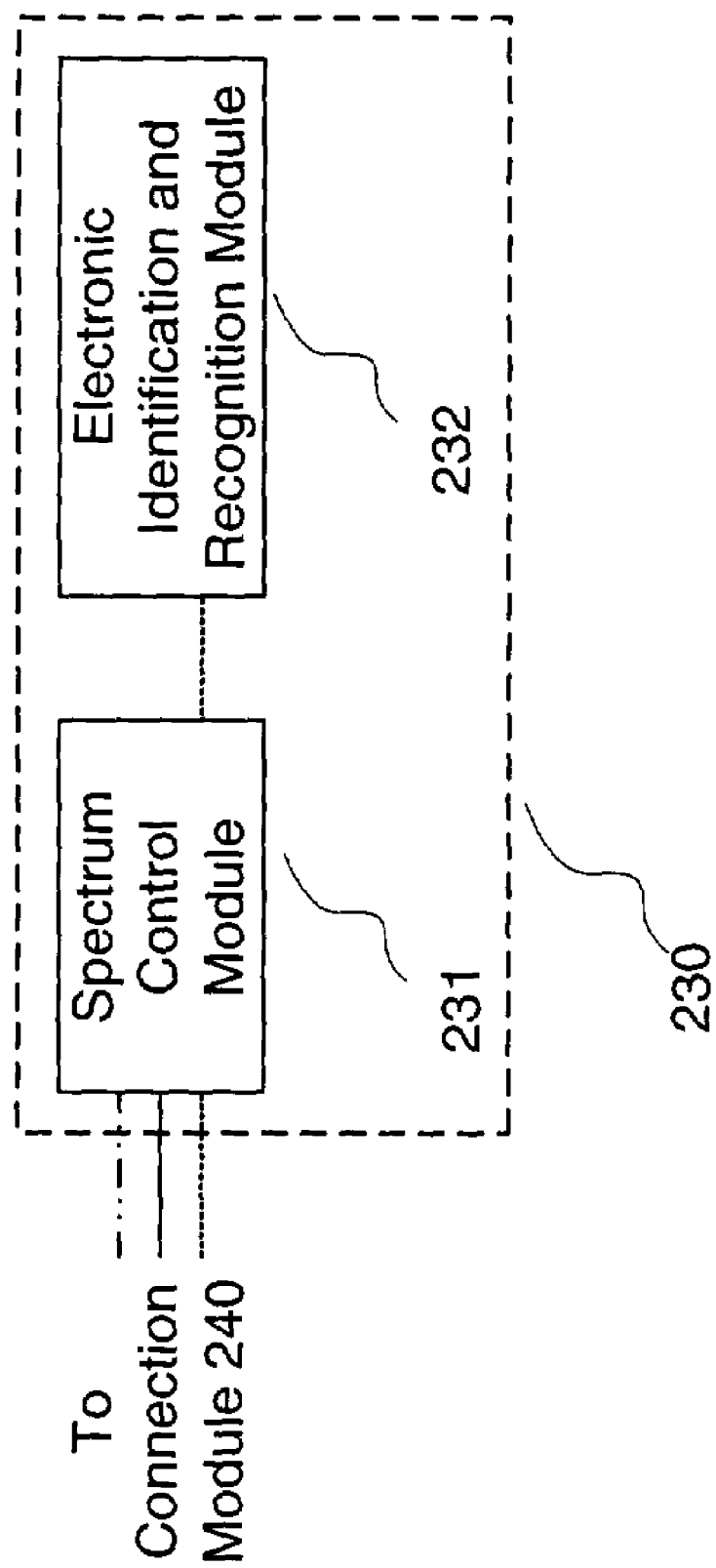
FIG. 11 is a schematic diagram of a presently preferred embodiment of a plug-in module according to the present invention.

In the presently preferred embodiment, the plug-in module 230 is a simple and low cost device that incorporates a means to define and control the emission spectrum characteristics of the optical output of fiber laser 210. Referring to FIG. 11, the means to define and control the emission spectrum characteristics is illustrated by a spectrum control module 231. In the presently preferred embodiment, the spectrum control module 231 comprises a reflective optical element capable of controlling the emission spectrum of the fiber laser 210 to a well-defined set of spectral characteristics, for example, the center frequency, line-width, and structure. For example, a suitable optical element to perform the functions of the spectrum control module 231 comprises a fiber Bragg grating. A fiber Bragg grating is a periodic modulation of the refractive index of the core of a single mode optical fiber usually written by exposure to UV light. It is readily apparent to one of ordinary skill in the art that such periodic structure is characterized by a narrow reflective spectral response mainly defined by its length while the center wavelength of the reflection band is mainly defined by the period of the induced refractive index modulation. It is readily apparent to one of ordinary skill in the art that the functions of this module may as well be performed by any passive or active devices known in the art such as, but not limited to spectral filters, bulk gratings, thin film coatings, prisms, or tunable filters. In most applications it is required that the emission spectrum characteristics remain stable with time and temperature. Thus, the spectrum control module 231 must incorporate a means for temperature stabilization, for example, an athermal packaging or active temperature control by a thermo-electric cooler. The plug-in module 230 also comprises a means for plug-in module 30 identification and recognition by the common fiber laser platform 220. Particularly, the means to identify and recognize each plug-in module 230 comprises an electronic identification and recognition module 232. The electronic identification and recognition module 232 preferably comprises a programmable non-volatile memory or key shunts, resistors, capacitors, filters, PROM, EEPROM, NVRAM, RF ID tag, and the like, the implementation of which is apparent to one of ordinary skill in the art.

The optical circulator 280 optically connects the connection module 240 to the output coupler 290. The output coupler 290 is preferably a fiber-fused coupler and is used to provide a useful optical output from the fiber laser 210. In the presently preferred embodiment, the coupling ratio of the output coupler 290 is such that it optimizes the optical output characteristics. As an illustrative example, the output coupler 290 may be a 10/90 fiber-fused coupler.

In the presently preferred embodiment of the invention, the common fiber laser platform 220 comprises an electronic control module 300. The electronic control module 300 provides the means to control and manage the overall operation of fiber laser 210. In the presently preferred embodiment, the means to control and manage the operation of fiber laser 210 is provided by a printed circuit board incorporating a microcontroller or microprocessor, power supplies, current drivers, electrical interface to plug-in module 230, electrical interface to output power control module 310, electrical interface to pump module 270, and electrical interface to an external user system.

Figure 12:
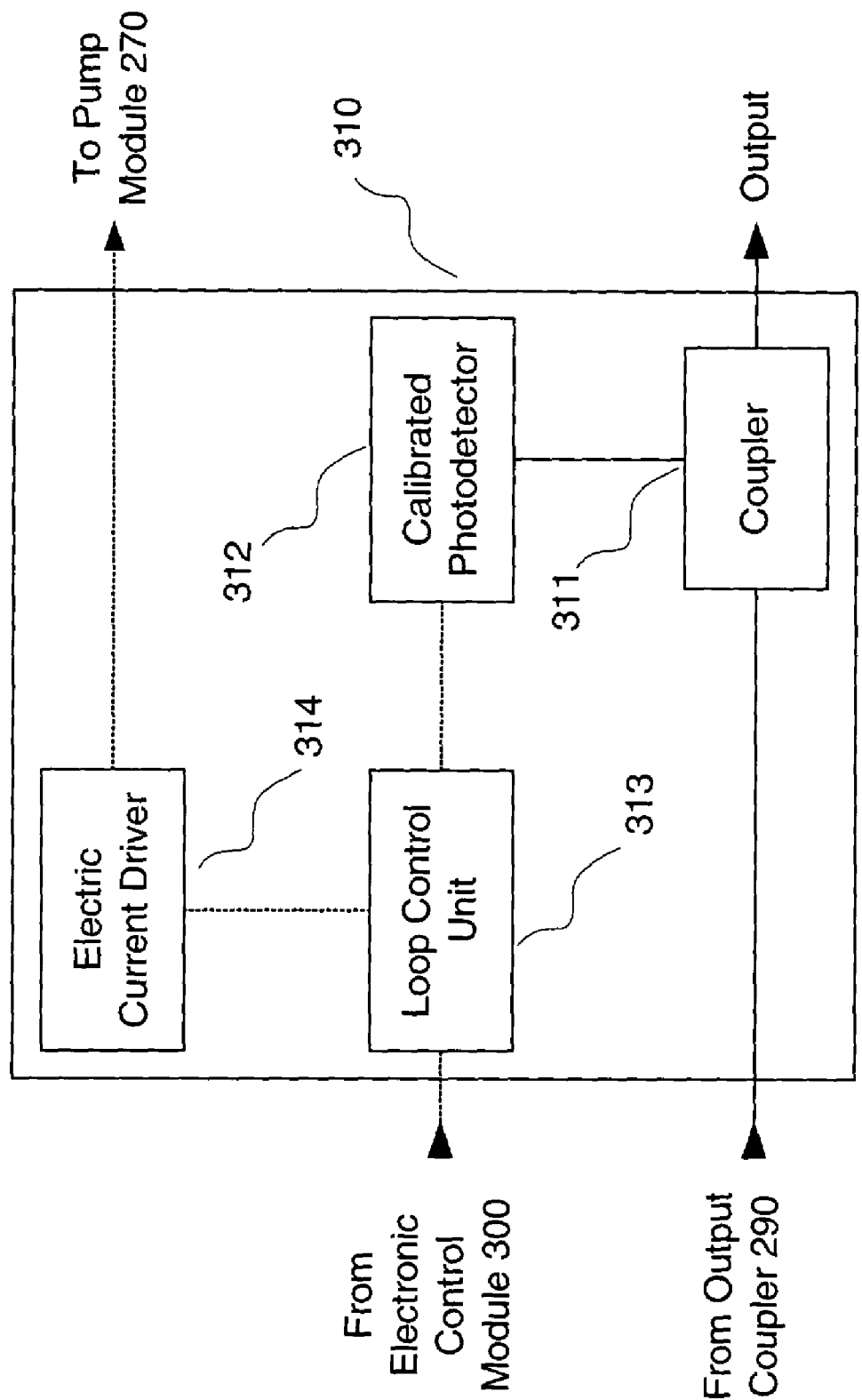
FIG. 12 is a schematic diagram of a presently preferred embodiment of a laser output power control module according to the present invention.

A laser output power control module 310 is inserted in-line with the output of the fiber laser 210, as depicted in FIG. 10, in order to set and maintain the optical output power of the fiber laser 210 according to a predetermined value. In the presently preferred embodiment of the invention, the laser output power control module 310 uses, as shown in FIG. 12, a tap coupler 311 to extract a fraction of the fiber laser 210 optical output power, which is optically coupled to a calibrated photodetector 312. As an illustrative example, the tap coupler 311 may be a 01/99 fiber-fused coupler. However, extracting a fraction of the output laser light radiation is not limited to this method and may be achieved by any of other methods known in the art, the identification and implementation of which is apparent to one of ordinary skill in the art. The loop control unit 313 uses the electric reference signal provided by both the calibrated photodetector 312 and the electronic control module 300 to ensure closed-loop control of an electric current driver 314 of the pump module 270. In the closed-loop mode of operation, laser output power instabilities caused by fluctuations in fiber laser 210 are reduced. The laser output power control module 310 also enables frequency independent laser output power as ensured by the electronic control module 300 that uses the identification and recognition signal provided by the electronic identification and recognition module 232 in each plug-in module 230 to provide a frequency compensated electric reference signal. It will be readily apparent to one of ordinary skill in the art that this frequency compensated electric reference signal can account for the frequency dependence of the overall cavity loss and the gain and of the optical components, namely the calibrated photodetector 312, the output coupler 290, and the tap coupler 311. It will also be readily apparent to one of ordinary skill in the art that the means to enable frequency independent laser output power are not limited to this method and may be achieved by any of several other methods known in the art, the identification and implementation of which are apparent.

The optical circulator 280 ensures unidirectional laser oscillation by providing a unidirectional low-loss optical connection from the gain module 250 to the connection module 240, and from the connection module 240 to the output coupler 290, and simultaneous precluding effective counter-propagating optical connections. The optical circulator 280 additionally prevents unwanted reflections induced by elements inside or outside the cavity from adversely affecting the operation of the fiber laser 210.

It will be readily apparent to one of ordinary skill in the art that the exact output frequency of the fiber laser 210 will be determined by the frequency dependence of both the overall cavity loss and the gain in the gain module 250, and by mode-pulling effects and laser instabilities of various natures. Moreover, within the passband defined by the spectral response of the spectrum control module 231 several cavity longitudinal modes may attain laser threshold, resulting in laser emission composed of several nearly equally spaced frequencies. For certain applications, the cavity of the fiber laser 210 may be designed to ensure single longitudinal mode operation, increasing side-mode suppression and reducing the emission line-width and noise. The total cavity length of the laser resonator is defined such that its longitudinal spectral mode structure in combination with the spectral characteristics of the spectrum control module 231 restricts the laser emission to only one or a set of well-defined cavity longitudinal modes. It will be readily apparent to one of ordinary skill in the art that both homogeneous line-broadening of the gain medium used in gain module 250 and unidirectional laser oscillation can further assist single longitudinal mode operation.

Figure 13:
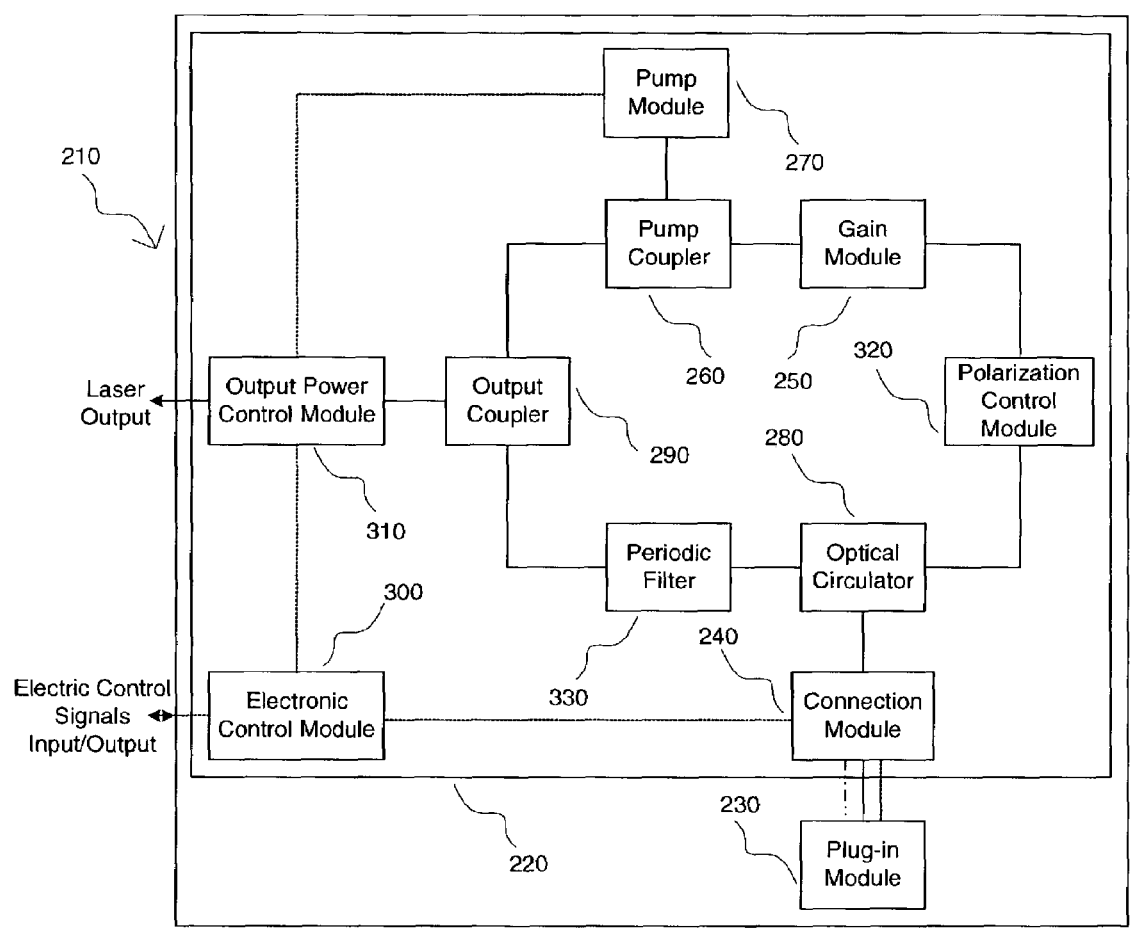
FIG. 13 is a schematic diagram of a presently preferred embodiment of a fiber-optic ring laser, with configurable optical emission spectrum characteristics, further including a polarization control module and a periodic filter according to the present invention.

In another embodiment of the invention, as depicted in FIG. 13, a polarization control module 320 is included in the common fiber laser platform 220 to define and control the polarization state of the fiber laser 210 and/or to optimize the laser operation whenever polarization-dependent elements are used within the laser cavity. It will be readily apparent to one of ordinary skill in the art that the definition and control of the polarization state of fiber laser 210 can be attained by a combination of a polarizer and a polarization control or by any other known means.

In yet another embodiment of the invention, a periodic filter 330 may additionally be inserted in-line with the fiber laser 210 cavity in order to limit the emission output frequency of the fiber laser 210 according to a predetermined grid of values. The periodic filter 330 is a filter which has high transmissivity for light with frequency within certain frequency bands, i.e., passbands, at approximately constant frequency spacing. Preferably, the periodic filter 330 has passbands spaced apart at a frequency spacing of 200 GHz or a sub-multiple of that spacing, such as 100 GHz, 50 GHz, 25 GHz, 12.5 GHz, etc. The periodic filter 330 limits the possible lasing frequencies of the fiber laser 210 by introducing lower optical loss at the passbands as compared to other frequencies, thereby precluding laser action at the low transmissivity bands. The center frequency of one, or more, of the passbands may be kept within certain values of a predetermined frequency so as to obtain a laser output with a frequency according to ITU frequency grid recommendations or according to any other desired set of frequencies. For certain applications, the periodic filter 330 may be tunable by electrical or mechanical means. It will be readily apparent to one of ordinary skill in the art that the inclusion of the periodic filter 330 within the laser cavity further assists the control of the laser emission spectral-width by defining a passband that results of the overlap of the spectral response of the spectrum control module 231 and the corresponding high transmission peak of the periodic filter 330. The periodic filter 330 is preferably a fiber or fiber-coupled Fabry-Pérot micro-etalon transmission filter. It will be readily apparent to one of ordinary skill in the art, however, that the specific choice of a component for implementing the functions of the periodic filter 330 is not limited to such a component. For example, a transmission or reflection filter made by any other means known in the art can be implemented such as, but not limited to discrete set of fiber Bragg gratings, sampled fiber Bragg gratings, long-period fiber gratings, fiber interferometers, fiber wavelength-dependent couplers, integrated-optic devices, quantum-well structures, and semiconductor waveguides.

Figure 14:
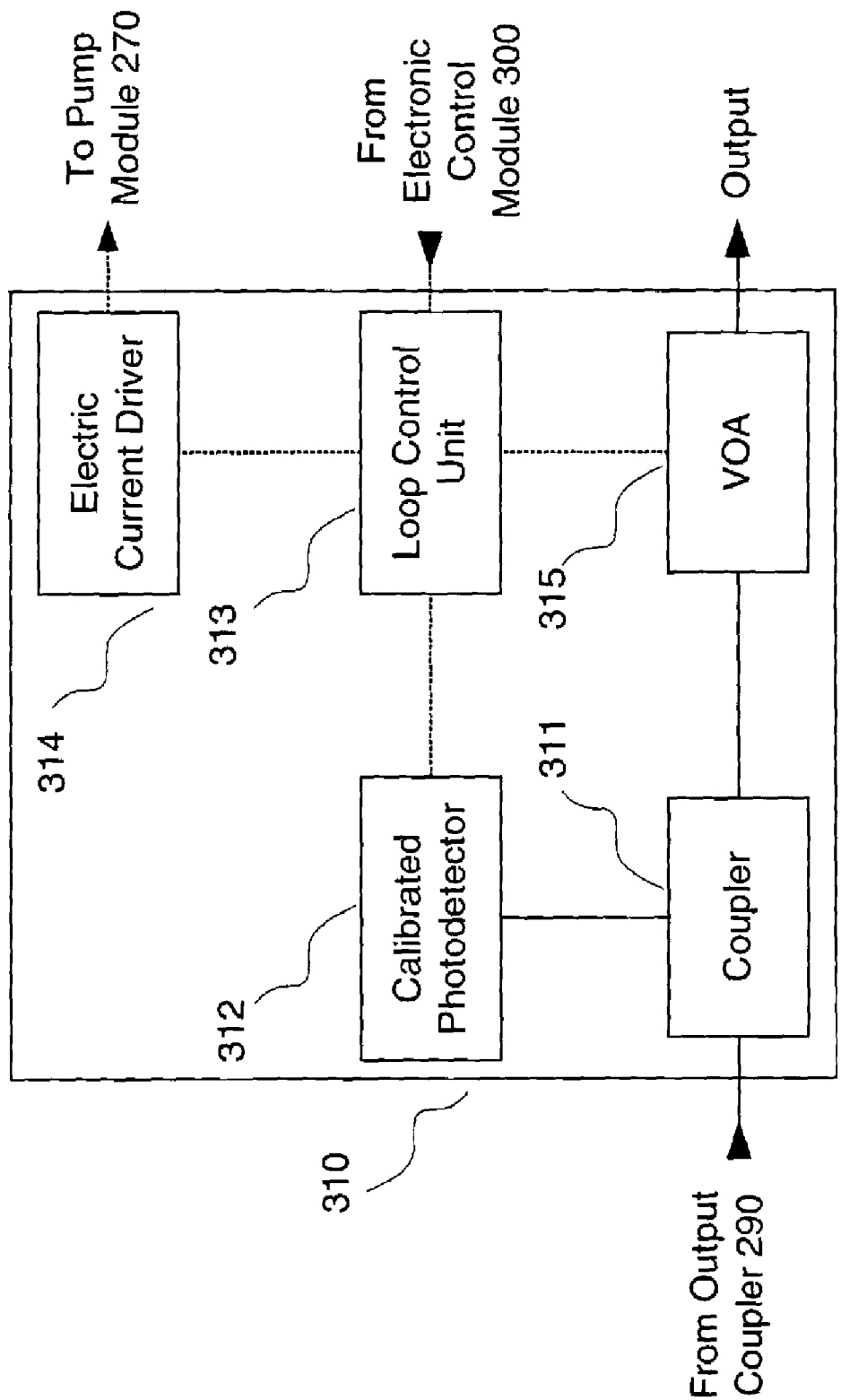
FIG. 14 is a schematic diagram of a presently preferred embodiment of a laser output power control module further including a variable optical attenuator according to the present invention.

In another embodiment of the invention, the laser output power control module 310 inserted in-line with the output of laser 210 can additionally include an in-line variable optical attenuator 315 in order to increase the dynamic range of the optical output power control of the fiber laser 210. Referring to FIG. 14, the laser output power control module 310 employs a coupler 311 to extract a fraction of the fiber laser 210 optical output power, which is optically coupled to a calibrated photodetector 312. The loop control unit 313 uses the electric reference signals provided by both the calibrated photodetector 312 and the electronic control module 310 to ensure closed-loop control of an in-line variable optical attenuator 315. The laser output power control module 310 can simultaneously ensure closed-loop control of an electric current driver 314 of the pump module 270. In such a configuration laser output power instabilities caused by fluctuations in laser 210 are prevented by the closed-loop operation of the electric current driver 314, while the variable optical attenuator 315 ensures the definition of the output optical power level of fiber laser 210. Inclusion of the variable optical attenuator 315 further increases the range of output power variation without compromising stable laser operation.

Components in the fiber laser 210 resonator are preferably optically coupled using lengths of single-mode fiber. For certain applications, the laser 210 resonator may comprise fiber lengths, in part or in total, made of polarization maintaining single-mode fiber or polarizing single-mode fiber. Also, for certain applications, the laser 210 resonator may also or alternatively include lengths of non-single-mode fiber. Additionally, the laser 210 resonator may comprise polarization sensitive and/or polarization maintaining components.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

We claim:

1. A laser apparatus comprising:
    a common incomplete laser resonator platform;
    an optical feedback plug-in module for determining at least one output beam characteristic of said laser apparatus; and
    a connection module for detachably coupling said optical feedback plug-in module with said common incomplete laser resonator platform.

2. An apparatus as claimed in claim 1 wherein said common incomplete laser resonator platform contains an optically-coupled arrangement of:
    a pump module for generating pump radiation,
    a gain module which is pumped by said pump radiation, said pump radiation exciting said gain module thereby enabling generation of laser radiation,
    an optical feedback module to provide feedback for said laser radiation, and
    an output coupler module for optically coupling said laser radiation externally to said laser apparatus, thereby providing a useful laser output beam.

3. An apparatus as claimed in claim 1 wherein said connection module is incorporated in said common incomplete laser resonator platform.

4. An apparatus as claimed in claim 1 wherein said optical feedback plug-in module, connected together with said common incomplete laser resonator platform through connection module defines said a complete optical laser resonator.

5. An apparatus as claimed in claim 2 wherein said feedback module comprises means for ensuring a high finesse optical resonator.

6. An apparatus as claimed in claim 2 wherein said gain module comprises an optical amplifier.

7. An apparatus as claimed in claim 2 wherein said output coupler module comprises means to extract a fraction of said laser resonator radiation providing said laser output beam.

8. An apparatus as claimed in claim 7 wherein said output coupler module further comprises means to extract multiple said laser output beams.

9. An apparatus as claimed in claim 2 wherein said pump module comprises means to supply energy to said optical amplifier.

10. An apparatus as claimed in claim 1
    wherein said plug-in module comprises means to define and control said laser output beam characteristics.

11. A laser apparatus comprising:
a common laser platform;
a plug-in module for determining at least one output characteristic of said laser apparatus; and
a connection module for detachably coupling said plug-in module with said common laser platform,
wherein said plug-in module comprises means to define and control said laser output beam characteristics, and wherein said means to define and control said laser output beam characteristics comprises a set of passive and/or active elements.

12. An apparatus as claimed in claim 11 wherein said set of passive and/or active elements comprises means to define and control the optical spectrum of said laser output beam.

13. An apparatus as claimed in claim 11 wherein said set of passive and/or active elements comprises means to define and control the optical power of said laser output beam.

14. An apparatus as claimed in claim 11 wherein said set of passive and/or active elements comprises means to define and control the polarization state of said laser output beam.

15. An apparatus as claimed in claim 11 wherein said set of passive and/or active elements comprises means to define and control said laser output beam divergence.

16. An apparatus as claimed in claim 11 wherein said set of passive and/or active elements comprises means to define and control said laser output beam spatial profile.

17. An apparatus as claimed in claim 1 wherein said optical feedback plug-in module further comprises means to extract a laser output beam.

18. An apparatus as claimed in claim 17 wherein said optical feedback plug-in module further comprises means to extract multiple independent laser output beams.

19. An apparatus as claimed in claim 1 wherein said connection module comprises means to optically, mechanically, and electrically connect said common incomplete laser resonator platform to said optical feedback plug-in module.

20. An apparatus as claimed in claim 1 further comprising additional said optical feedback plug-in modules defining a set of optical feedback plug-in modules.

21. An apparatus as claimed in claim 20 wherein said set of optical feedback plug-in modules further comprises means to extract said laser output beam.

22. An apparatus as claimed in claim 20 wherein said set of optical feedback plug-in modules further comprises means to extract multiple said laser output beams.

23. An apparatus as claimed in claim 20 wherein said set of optical feedback plug-in modules is arranged in a serial configuration.

24. An apparatus as claimed in claim 23 wherein each said optical feedback plug-in module within said set of optical feedback plug-in modules is optically, mechanically, and electrically connected to each other through said connection module.

25. An apparatus as claimed in claim 23 wherein said set of optical feedback plug-in modules is connected to said common incomplete laser resonator platform through said connection module.

26. An apparatus as claimed in claim 20 wherein said set of optical feedback plug-in modules is optically arranged in a parallel configuration.

27. An apparatus as claimed in claim 26 wherein each said optical feedback plug-in module within said set of plug-in modules is optical, mechanical, and electrical independently connected to said common incomplete laser resonator platform through said connection module.

28. A laser apparatus comprising:
a common incomplete fiber laser resonator platform;
an optical feedback plug-in module for defining at least one output optical beam spectrum characteristic of said fiber laser platform; and
a connection module for detachably coupling said optical feedback plug-in module with said common incomplete fiber laser resonator platform.

29. The laser apparatus of claim 28, wherein said optical feedback plug-in module comprises the optical means to define and control said emission optical frequency.

30. The laser apparatus of claim 29, wherein said emission optical frequency is an ITU channel frequency.

31. The apparatus of claim 28, wherein said common incomplete fiber laser resonator platform contains an optically-coupled arrangement comprising:
a pump module for generating pump radiation,
an input coupler for optically coupling said pump radiation into said common incomplete fiber laser resonator platform,
a gain module, said pump radiation exciting said gain module thereby enabling the generation of laser radiation, and
an output coupler module for optically coupling out said laser radiation providing a useful laser output.

32. The apparatus of claim 28, wherein said optical feedback plug-in module comprises
a spectrum control module.

33. The apparatus of claim 32, wherein said spectrum control module comprises
a reflective optical element.

34. The apparatus of claim 33, wherein said reflective optical element is a Bragg grating.

35. The apparatus of claim 34, wherein one of said at least one output optical spectrum characteristic is selected from the group consisting of:
frequency, spectral-width, and spectral structure.

36. The apparatus of claim 32, wherein said spectrum control module comprises one or more passive or active optical elements selected from the group consisting of:
a passband filter, a bulk grating, a thin film coating, a prism, a mirror, and a tunable filter.

37. The apparatus of claim 35, wherein said frequency is an ITU frequency.

38. The apparatus of claim 28, wherein said common incomplete fiber laser resonator platform further comprises
an optical circulator optically coupled to said connection module.

39. The apparatus of claim 31, wherein said input coupler comprises
a fiber-fused wavelength division multiplexer.

40. The apparatus of claim 31, wherein said common incomplete fiber laser resonator platform further comprises
an electronic control module.

41. The apparatus of claim 40, wherein said common incomplete fiber laser resonator platform further comprises
an optoelectronic output power control module.

42. The apparatus of claim 41, wherein said optoelectronic output power control module comprises:
a calibrated photodetector;
a loop control unit, wherein said loop control unit is electrically coupled to said calibrated photodetector and said electronic control module; and
an electric current driver, wherein said electric current drive is electrically coupled to said loop control unit and said pump module.

43. The apparatus of claim 42, wherein said optoelectronic output power control module further comprises
a variable optical attenuator.

44. The apparatus of claim 31, wherein said common incomplete fiber laser resonator platform further comprises
a polarization control module.

45. The apparatus of claim 31, wherein said common incomplete fiber laser resonator platform further comprises
a periodic filter.

46. The apparatus of claim 45, wherein said periodic filter comprises
a fiber Fabry-Pérot filter.

47. A method of generating a laser output at any one of a set of discrete frequencies comprising the steps of:
provide pump energy to a gain medium in a common incomplete fiber laser resonator platform to excite a laser resonance;
connecting an optical feedback plug-in module comprising a resonant filter to said common incomplete fiber laser resonator platform through a detachable connection module; and
filtering said laser resonance using said resonant filter matching one of said frequencies in said set.

48. The method of claim 47 further comprising the step of
replacing said optical feedback plug-in module by another optical feedback plug-in module comprising a resonant filter matching another one of said frequencies in said set.

49. An optical feedback plug-in module for a laser apparatus comprising:
means for detachably coupling said optical feedback plug-in module to a laser platform; and
means for defining an output beam characteristic of said laser platform.

50. An optical feedback plug-in module for a laser apparatus comprising:
an interface for detachably coupling said optical feedback plug-in module to a laser platform; and
an optical element selected from the group consisting of: a spectrum control element; a polarization control element; a divergence control element; a spatial profile control element; and a combination thereof,
wherein said optical element defines an output beam characteristic of said laser platform.

* * * * *